US009821994B2

(12) United States Patent
McIntyre et al.

(10) Patent No.: US 9,821,994 B2
(45) Date of Patent: Nov. 21, 2017

(54) SYSTEMS AND METHODS FOR BEVERAGE PRESERVATION

(71) Applicants: Keith W. McIntyre, Bellevue, WA (US); John J. Parry, Sammamish, WA (US)

(72) Inventors: Keith W. McIntyre, Bellevue, WA (US); John J. Parry, Sammamish, WA (US)

( * ) Notice: Subject to any disclaimer, the term of this patent is extended or adjusted under 35 U.S.C. 154(b) by 17 days.

(21) Appl. No.: 14/949,751

(22) Filed: Nov. 23, 2015

(65) Prior Publication Data

US 2016/0318750 A1 Nov. 3, 2016

Related U.S. Application Data

(63) Continuation-in-part of application No. 14/700,011, filed on Apr. 29, 2015, now Pat. No. 9,193,577.
(Continued)

(51) Int. Cl.
*B67D 1/04* (2006.01)
*B67D 1/00* (2006.01)
(Continued)

(52) U.S. Cl.
CPC ............. *B67D 1/0437* (2013.01); *A23L 2/42* (2013.01); *A23L 3/001* (2013.01); *A23L 3/0155* (2013.01); *B67D 1/0004* (2013.01); *B67D 1/04* (2013.01); *B67D 1/0885* (2013.01); *B67D 1/125* (2013.01); *C12H 1/14* (2013.01); *C12H 1/16* (2013.01); *B67D 1/1252* (2013.01); *B67D 2001/0481* (2013.01); *B67D 2001/0822* (2013.01); *B67D 2001/0824* (2013.01)

(58) Field of Classification Search
CPC .. C12H 1/14; C12H 1/16; A23L 3/001; A23L 3/0155; A23L 2/42; B67D 1/0437; B67D 1/0004; B67D 1/125; B67D 2001/0824; B67D 2001/0822; B67D 1/1252; B67D 2001/0481; B67D 1/04; B67D 1/0885
See application file for complete search history.

(56) References Cited

U.S. PATENT DOCUMENTS 2,120,297 A * 6/1938 Reinecke ................. A23G 9/20
141/19
4,856,680 A * 8/1989 Sitton ...................... B67D 1/04
222/130
(Continued)

*Primary Examiner* — Frederick C Nicolas
(74) *Attorney, Agent, or Firm* — Puget Patent; Michael Gibbons

(57) ABSTRACT

A receptacle for storing, pressurizing, and dispensing packaged beverages. The receptacle includes an airtight chamber with a removable lid, wherein the joint between the lid and the chamber is also airtight. A gas valve allows for the inflow and outflow of gas, and a tap port and tap stem allow the beverage to be dispensed without breaking the seal of the chamber. A pressure relief valve allows for more rapid depressurization. The chamber can be used at high and low pressures, such as a partial vacuum, to prevent oxidation of a number of open beverages, such as beers, wines, and sodas. A pressure gauge port coupled with an optional pressure gauge allows a user to verify the appropriate pressure for the type of beverage being preserved. The gas valve may be disposed on a base of the receptacle, as may the pressure relief and/or the pressure gauge port.

20 Claims, 21 Drawing Sheets

Related U.S. Application Data

(60) Provisional application No. 62/193,274, filed on Jul. 16, 2015.

(51) Int. Cl.
*B67D 1/12* (2006.01)
*A23L 2/42* (2006.01)
*A23L 3/00* (2006.01)
*A23L 3/015* (2006.01)
*B67D 1/08* (2006.01)
*C12H 1/14* (2006.01)
*C12H 1/16* (2006.01)

(56) References Cited

U.S. PATENT DOCUMENTS

| | | | | |
|---|---|---|---|---|
| 4,869,402 A | * | 9/1989 | Ash, Jr. | B67D 1/045 206/521 |
| 5,199,609 A | * | 4/1993 | Ash, Jr. | B67D 1/0406 141/114 |
| 5,240,144 A | * | 8/1993 | Feldman | B67D 1/0001 222/105 |
| 5,251,787 A | * | 10/1993 | Simson | B67D 1/0462 222/105 |
| 5,529,220 A | * | 6/1996 | Credle, Jr. | B67D 1/04 221/96 |
| 6,783,034 B1 | * | 8/2004 | Brent | B67D 1/0418 222/183 |
| 7,597,124 B2 | * | 10/2009 | Litto | B67D 1/0462 141/114 |
| 9,193,577 B2 | * | 11/2015 | McIntyre | B67D 1/04 |
| 9,580,286 B2 | * | 2/2017 | McIntyre | B67D 1/04 |
| 2016/0318749 A1 | * | 11/2016 | McIntyre | B67D 1/04 |
| 2016/0318750 A1 | * | 11/2016 | McIntyre | C12H 1/14 |
| 2017/0174495 A1 | * | 6/2017 | McIntyre | B67D 1/0412 |

* cited by examiner

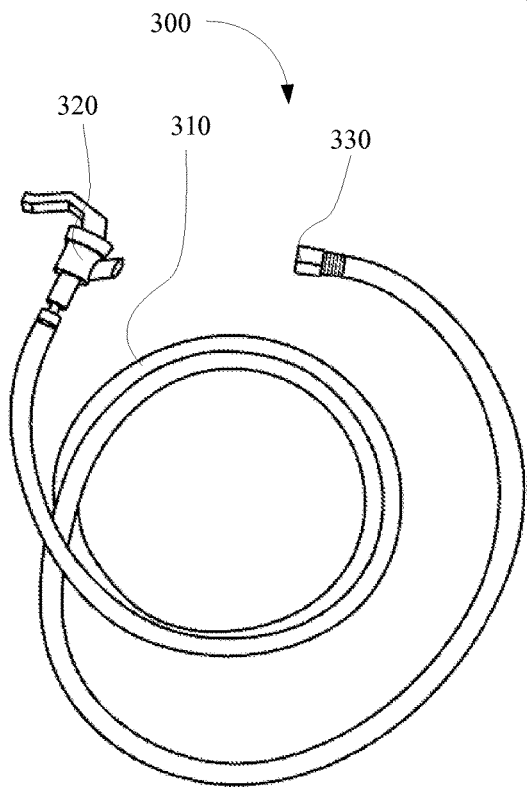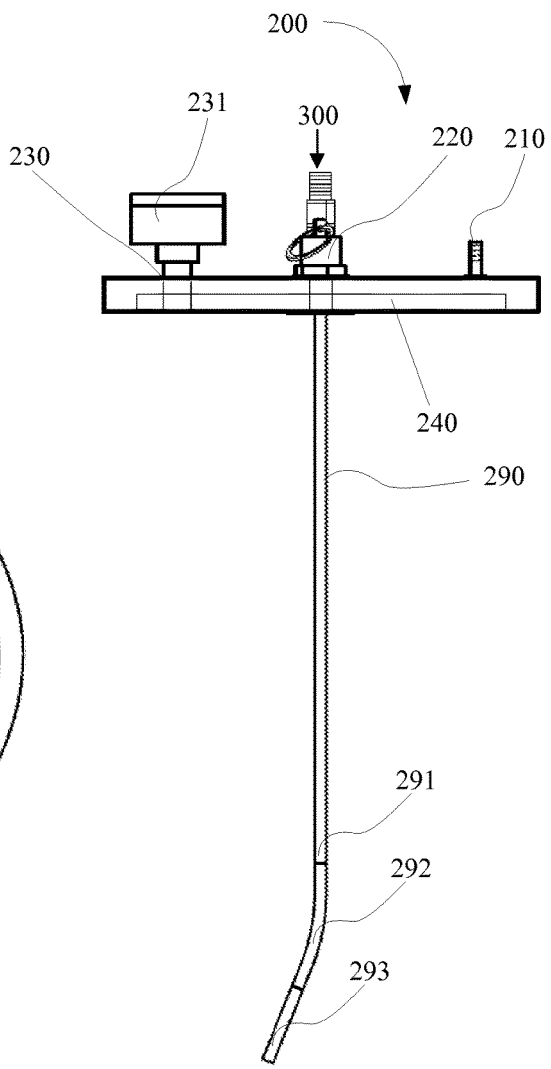
Figure 5a
Figure 5b

SYSTEMS AND METHODS FOR BEVERAGE PRESERVATION

PRIORITY CLAIM

The present application is related to and/or claims the benefits of the earliest effective priority date and/or the earliest effective filing date of the below-referenced applications, each of which is hereby incorporated by reference in its entirety, to the extent such subject matter is not inconsistent herewith, as if fully set forth herein:

(1) this application constitutes a continuation of U.S. patent application Ser. No. 14/700,011, entitled SYSTEMS AND METHODS FOR BEVERAGE PRESERVATION, naming Keith W. McIntyre and John J. Parry as inventors, filed Apr. 29, 2015, which is currently co-pending or is an application of which a currently co-pending application is entitled to the benefit of the filing date; and (2) this application constitutes a non-provisional of U.S. Provisional Patent Application No. 62/193,274, entitled SYSTEMS AND METHODS FOR BEVERAGE PRESERVATION, naming Keith W. McIntyre and John J. Parry as inventors, filed Jul. 16, 2015.

FIELD OF THE INVENTION

This invention relates generally to receptacles, and, more specifically, to receptacles for storing and preserving packaged beverages.

BACKGROUND OF THE INVENTION

Opening a packaged beverage invariably leads to oxidation of the beverage. Additionally, beverages that are carbonated or otherwise gas-dispensed, such as with carbon dioxide or nitrogen, will begin to lose the gas once the pressure is released, causing the beverage to go flat. The present disclosure contains systems and methods for preservation of packaged beverages.

SUMMARY

This invention relates generally to receptacles, and, more specifically, to receptacles for storing and preserving packaged beverages. The receptacle is comprised essentially of a vessel and a lid, and it is designed to receive packaged beverages.

In some embodiments, the beverage preservation device may be comprised of a vessel; a lid with a top surface and a bottom surface, the lid removably coupled with the vessel; a gas valve, the gas valve disposed through the lid; and a tap port disposed through the lid. In some embodiments, the lid may further comprise a pressure relief valve disposed through the lid. In some embodiments, the lid may further comprise a gasket disposed on the bottom surface of the lid. In some embodiments, the lid may further comprise a pressure gauge port disposed through the lid. In some embodiments, the lid may further comprise a tap stem coupled with the tap port. In some embodiments, the tap stem may further comprise a rigid first portion coupled with the tap port; a flexible second portion coupled with the rigid first portion; and a rigid third portion coupled with the flexible second portion. In some embodiments, the flexible second portion of the tap stem may be slightly curved. In some embodiments, the lid and the vessel may be removably coupleable. In some embodiments, the lid coupled with the vessel may form an airtight seal.

In some embodiments, the beverage preservation device may comprise a vessel, the vessel further comprising: a base; a chamber joined with and perpendicular to the base, wherein the joint is airtight. The beverage preservation device may be further comprised of a lid with a top surface and a bottom surface, wherein an area of the lid is approximately equal to an area of the base, the lid further comprising: a gasket disposed on the bottom surface of the lid, wherein a perimeter formed by the gasket is approximately equal to a perimeter of the chamber; a gas valve, the gas valve disposed inside the perimeter of the gasket and through the top surface and the bottom surface of the lid, wherein the inlet of the valve is accessible from the top surface of the lid; and a pressure relief valve disposed inside the perimeter of the gasket and through the top surface and the bottom surface of the lid, wherein a control handle of the pressure relief valve is accessible from the top surface of the lid. In some embodiments, the lid may further comprise a pressure gauge port disposed within the perimeter of the gasket and through the top surface and the bottom surface of the lid. In some embodiments, the lid may further comprise a tap port disposed within the perimeter of the gasket and through the top surface and the bottom surface of the lid. In some embodiments, the lid may further comprise a tap stem, the tap stem further comprising: a rigid first portion coupled with the tap port and descending into the chamber; a flexible second portion with a first end and a second end, the first end coupled with the first portion; and a rigid third portion, the third portion coupled with the second end of the second portion. In some embodiments, the flexible second portion may be slightly curved.

In some embodiments, the beverage preservation device may comprise a vessel, the vessel further comprising: a base; a chamber joined with and perpendicular to the base, wherein the joint is airtight; and at least one bolt coupled with the base, disposed parallel and external to the chamber, wherein the bolt extends beyond the length of the chamber. In some embodiments, the beverage preservation device may be further comprised of a lid with a top surface and a bottom surface, wherein an area of the lid is approximately equal to an area of the base, the lid further comprising: a gasket disposed on the bottom surface of the lid, wherein a perimeter formed by the gasket is approximately equal to a perimeter of the chamber; a gas valve disposed inside the perimeter of the gasket and through the top surface and the bottom surface of the lid, wherein the inlet of the valve is accessible from the top surface of the lid; and a pressure relief valve disposed inside the perimeter of the gasket and through the top surface and the bottom surface of the lid, wherein a control handle of the pressure relief valve is accessible from the top surface of the lid; wherein the lid is removably coupleable with the vessel, the gasket of the lid forming an airtight joint between the lid and the vessel. In some embodiments, the beverage preservation device may be further comprised of a tap system disposed inside the perimeter of the gasket and through the top surface and the bottom surface of the lid. In some embodiments, the tap system may be coupleable with a standard keg tap system. In some embodiments, the beverage preservation device is further comprised of a pressure gauge port disposed inside the perimeter of the gasket and through the top surface and the bottom surface of the lid; and a pressure gauge removably inserted into the pressure gauge port.

In some embodiments, a beverage preservation device may comprise a vessel including at least a base and a tube; a lid, the lid removably coupled with the vessel; a gas valve, the gas valve disposed through a top surface of the base; a passage disposed through an interior portion of the base, the passage including at least: an end of the passage coupled with the gas valve; and a vent into the vessel disposed at an opposing end of the passage; and a tap port, the tap port disposed through the lid.

In some embodiments, the passage disposed through an interior portion of the base comprises a passage disposed between the top surface of the base and the bottom surface of the base, the passage including at least a portion extending laterally through the base. In some embodiments, the beverage preservation device, further comprises the passage including at least one substantially vertical portion at an interior end of the portion extending laterally through the base, the first substantially vertical portion extending to an aperture in the top surface of the base to form the vent into the vessel. In some embodiments, the vessel including at least a base and tube comprises a vessel including at least the base having a circular square-cut channel on the top surface of the base configured for receiving the tube.

In some embodiments, the passage disposed through an interior portion of the base comprises a passage disposed through an interior portion of the base, the passage passing underneath a channel in the base for receiving the tube. In some embodiments, the vessel including at least a base and tube comprises a vessel, the vessel including at least a one-piece vessel including at least a base section and a tube section of the one-piece vessel. In some embodiments, the beverage preservation device further comprises a pressure gauge port. In some embodiments, the beverage preservation device further comprises at least one of another passage disposed through another interior portion of the base, the another passage including at least an end coupled with a pressure relief and a vent into the vessel disposed at an opposing end; and another passage disposed through another interior portion of the base, the another passage including at least an end coupled with a pressure gauge port and a vent into the vessel disposed at an opposing end.

In some embodiments, the beverage preservation device further comprises a pressure relief. In some embodiments, the lid further comprises a gasket disposed on the bottom surface of the lid. In some embodiments, the beverage preservation device further comprises at least one of a fastener arrangement or closure arrangement configured for compressing together the lid, gasket, and tube to form an airtight seal of the receptacle.

In some embodiments, the beverage preservation device further comprises a yoke configured for compressibly closing the lid over the tube. In some embodiments, the vent into the vessel disposed at an opposing end of the passage comprises a gas diffuser. In some embodiments, the lid comprises a tap stem coupled with the tap port. In some embodiments, the tap stem comprises a rigid first portion coupled with the tap port; a flexible second portion coupled with the rigid first portion; and a rigid third portion coupled with the flexible second portion. In some embodiments, the flexible second portion of the tap stem is slightly curved. In some embodiments, the lid and the vessel are removably couplable. In some embodiments, the lid coupled with the vessel forms an airtight seal.

In some embodiments, a beverage preservation system includes, but is not limited to, a receptacle for removably receiving at least one beverage package; means for maintaining an airtight seal of the receptacle; means for pressurizing the receptacle; and means for enabling dispensing, upon the receptacle being pressurized, of a content contained by a beverage package received by the receptacle.

In some embodiments, a beverage preservation device includes, but is not limited to means for receiving at least one beverage package; means for pressurizing the means for receiving; and means for dispensing a content contained by the at least one beverage package from within the means for receiving.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 5a is a top view of one embodiment of the tap system.

FIG. 5b is a side view of the lid of the receptacle.

FIG. 13b is a close-up view of a portion of the embodiment depicted in FIG. 13a.

FIG. 13c is a side view of a portion of the embodiment depicted in FIG. 13a.

FIG. 13d is a top view of an alternate embodiment of a base depicted in FIG. 13a.

FIG. 15b is another isometric view of the alternate embodiment depicted in FIG. 15a.

DETAILED DESCRIPTION

This invention relates generally to receptacles, and, more specifically, to receptacles for storing and preserving packaged beverages. Specific details of certain embodiments of the invention are set forth in the following description and in FIGS. 1-15b to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
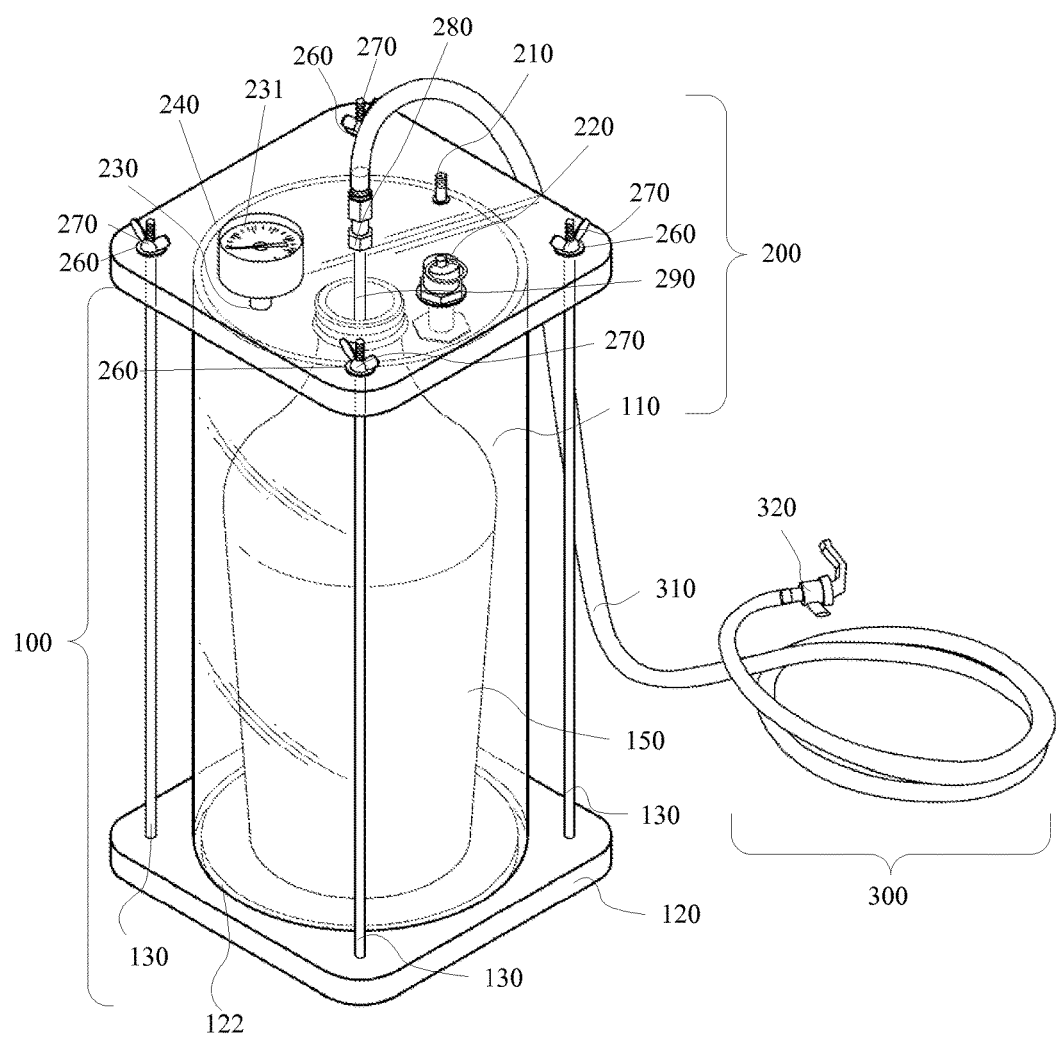
FIG. 1 is an isometric view of one embodiment of the receptacle for storing and preserving packaged beverages.

FIG. 1 is an isometric view of the receptacle for storing and preserving beverages. The receptacle is comprised essentially of a vessel 100 and a lid 200, and it is designed to receive beverage packages, such as beverage package 150.

In some embodiments, vessel 100 may be further comprised of a chamber 110. In some embodiments, chamber 110 may be tubular, having a volume formed by a circular perimeter. In other embodiments, chamber 110 may have a rectangular volume. In still other embodiments, chamber 110 may have a triangular volume. The volume formed by chamber 110 may be any number of shapes without altering the function of the device. In some embodiments, chamber 110 may be comprised of a thermoplastic resin material. Such material may include, but is not limited to, acrylic resin, acrylic plastic, or another acrylic formulation. In other embodiments, chamber 110 may be comprised of a metal. Further, chamber 110 may be comprised of any number of rigid or semi-rigid materials without altering its function. In some embodiments, chamber 110 may be comprised of a material with specific heat properties, such as being able to withstand very high or very low temperatures. In some embodiments, chamber 110 may be comprised of a material with specific strength properties, such as being able to withstand very high pressures exerted from within the chamber, being able to withstand very high external pressures, or being able to withstand a significant difference between the internal and external pressures on the chamber.

In some embodiments, vessel 100 may be further comprised of a base 120. Base 120 will generally be coupled with chamber 110 in such a manner that the joint is airtight. For example, a channel 122 may be formed inside the top side of the base for receiving the chamber. The channel may be round and have substantially the same inner and outer diameters as the chamber 110 ("substantially the same" here meaning that the width of the channel defined as the distance between the inner and outer diameters may be slightly larger than the thickness of the chamber, e.g. 0.01" larger, in order to snugly accommodate the chamber). The channel formed inside the top side of the base may be a square-cut channel and may receive the chamber 110 in a permanent, semi-permanent, or removable fashion. The channel may receive a gasket onto which the chamber is seated, the gasket having an appearance similar to that depicted in and discussed with respect to FIGS. 6a-6c. In embodiments where the channel of the base receives the chamber with a permanent joint, no gasket may be needed to maintain an airtight character of the vessel.

In some embodiments, base 120 will be approximately the same area as the perimeter formed by chamber 110. In other embodiments, the area of base 120 will be larger than the perimeter formed by chamber 110. Base 120 may be comprised of the same material as chamber 110. In other embodiments, base 120 may be comprised of a different material than chamber 110. In still other embodiments, base 120 and chamber 110 may be formed as a single unit, such that no seam exists between the two elements.

In some embodiments, vessel 100 may be further comprised of fastener 130. In some embodiments, vessel 100 may have multiple fasteners 130. In a non-limiting example, FIG. 1 shows vessel 100 with three fasteners 130, and a fourth is not shown as it is obscured by other elements. In another non-limiting example, if the perimeter formed by the chamber is triangular, vessel 100 may have only three fasteners 130, such as one at each vertex. A primary function of fastener 130 is to couple lid 200 with the vessel 100, and this function may be accomplished in a number of ways. Another primary function of the fastener is to create a removable airtight joint between vessel 100 and lid 200, which can also be accomplished in many ways. In some embodiments, fastener 130 may be a pin, rod or a bolt. In the exemplary embodiment shown in FIG. 1, fastener 130, which is a bolt, may be joined with base 120 and extend substantially parallel to the height of chamber 110, wherein lid 200 is placed on chamber 110 and bolts and washers are used to tighten the lid onto the chamber. This embodiment is discussed in more detail in another section. In other embodiments, fastener 130 may be comprised of a ratchet strap system, wherein the airtight joint is created by disposing the strap around the vessel 100 and lid 200 and cranking the ratchet until the strap is taut. In other embodiments, fastener 130 may be a clamp fastener, wherein a first portion of the fastener is coupled with the external perimeter of chamber 110 and a second portion of the fastener is coupled with lid 200, and the portions are coupled and tightened to form the airtight joint. In some embodiments, fastener 130 may be a system comprised of a clip and a toothed belt, wherein one of the clip or toothed belt is disposed on the external perimeter of the chamber 110 and the other of the clip or toothed belt is disposed on lid 200, then the portions are coupled and tightened to form the airtight joint. A number of methods could be used without altering the primary functions of fastener 130.

FIG. 1 further depicts details of lid 200. In some embodiments, lid 200 will be approximately the same area as the perimeter formed by chamber 110. In other embodiments, the area of lid 200 may be larger than the perimeter formed by chamber 110. Lid 200 may be comprised of the same material as chamber 110. In other embodiments, lid 200 may be comprised of a different material than chamber 110. In some embodiments, lid 200 is further comprised of a gas valve 210. Gas valve 210 is a port for gas, allowing a user to fill chamber 110 with a gas of the user's choice using a tank type of the user's choice. The valve may be a Schrader or Presta type valve. Such a valve would facilitate use of an inflator for bicycle tires as the tank type of choice. Other tank types of choice could include a paintball CO2 tank, a CO2 welding cylinder, or any other supply of CO2. The valve could also be a hose barb for receiving tubing leading to the tank type of choice. In a different embodiment, the valve may include a threaded fitting for receiving threadably-coupleable gas line tubing. Other gases may be introduced into the chamber, such as nitrogen, using an appropriate tank such as a nitrogen cylinder or a nitrogen bicycle inflator In some embodiments, a regulator may be disposed in the gas line, between the receptacle and gas tank of choice. The regulator facilitates a constant pressure within the receptacle. When beverage content is dispensed the regulator would provide more gas to the chamber up to the desired pressure set by the user.

In some embodiments, gas valve 210 may be a one-way valve, allowing a user to only add gas to chamber 110. In other embodiments, gas valve 210 may be a two-way valve, through which gas may be added or removed from the chamber. In some embodiments, lid 200 may be further comprised of a pressure relief valve 220. Pressure relief valve 220 allows a user to release a controlled or semi-controlled amount of gas to reduce the internal pressure of chamber 110. In different embodiments, the gas valve and pressure relief valve may be the same valve. Lid 200 may be further comprised of a pressure gauge port 230. Vessel 100 is designed to withstand a wide range of pressures, and a pressure gauge port gives users the option of attaching a pressure gauge 231 to monitor and help control the pressure in chamber 110.

A gasket 240 disposed in a channel on the bottom surface of lid 200 may, in some embodiments, be included to facilitate the airtight seal between vessel 100 and lid 200. In some embodiments, gasket 240 may be substantially the same shape and perimeter as chamber 110. In some embodiments, gasket 240 may be slightly larger or slightly smaller than the perimeter formed by chamber 110, in order to facilitate the proper joint between vessel 100 and lid 200. More details about gasket 240 are included further herein.

Lid 200 may be coupled with vessel 100 through fasteners 130. In the embodiment depicted in FIG. 1, fasteners 130 are bolts. When lid 200 is placed on top of vessel 100, fasteners 130 are passed through holes 250 (depicted in FIG. 2), and the joint is completed when washers 260 and nuts 270 are tightened onto the bolts. This is one exemplary embodiment of a coupling arrangement, and should not be construed as limiting the disclosure in any way.

Figure 9:
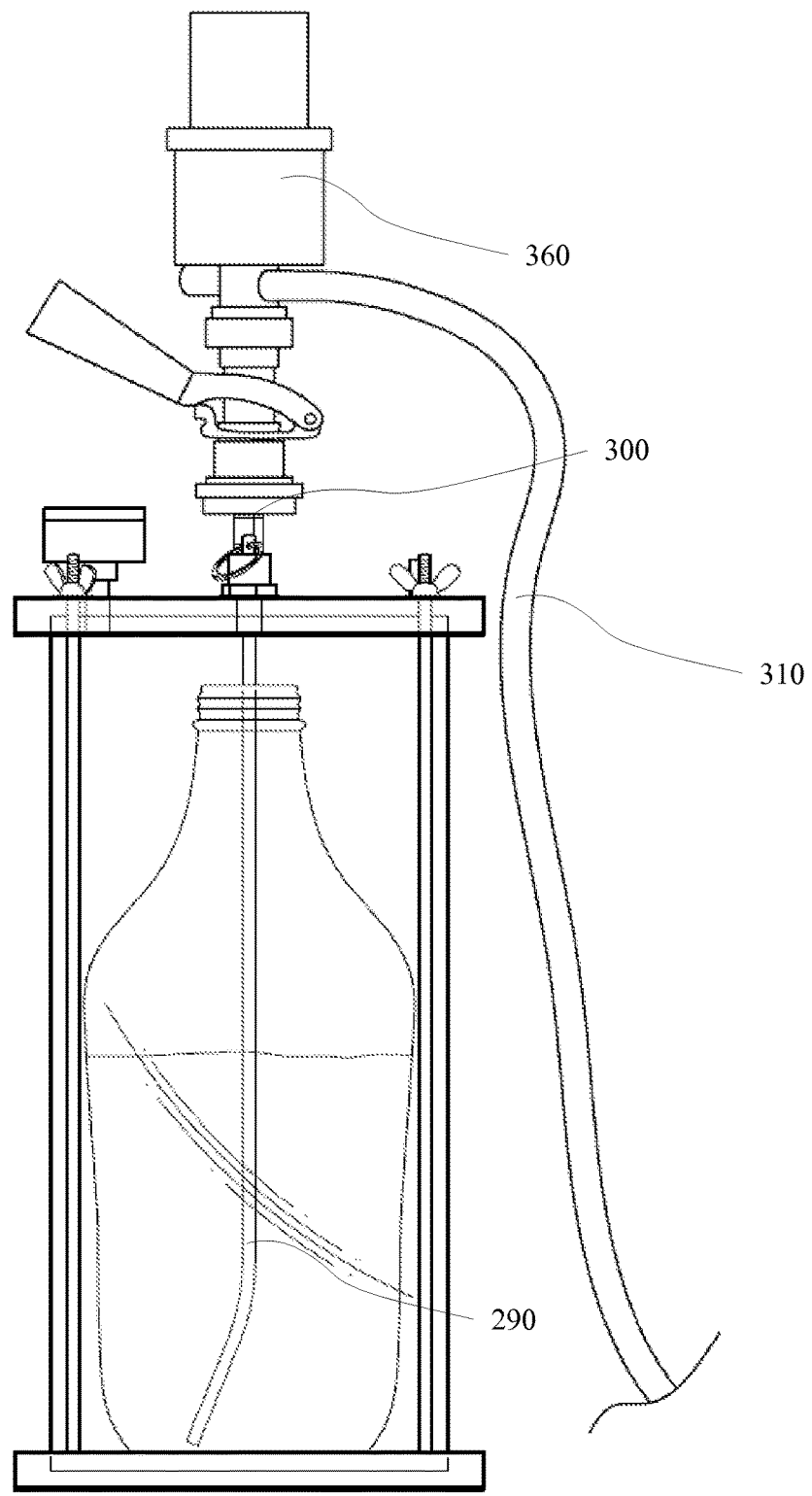
FIG. 9 is a side view of the receptacle with an alternative tap system.

The receptacle for storing and preserving beverages may include a means by which the beverage or other content can be dispensed without removing the package entirely. In FIG. 1, this is depicted by tap 280. Tap 280 allows a tap system 300 to be coupled with lid 200. Lid 200 may, in some embodiments, include a tap stem 290. In some embodiments, tap stem 290 is disposed through tap 280 and into the beverage package, allowing a user to draw the beverage into the stem and then dispense through tap system 300. In some embodiments, tap 280 may be a screw valve. In different embodiments, tap 280 may be a hose barb. In some embodiments, tap 280 may be a ball lock valve (depicted in FIG. 10). In other embodiments, tap 280 may be a Sankey valve. In still other embodiments, tap 280 may be coupleable with any commercial tap system, as depicted in FIG. 9. Tap system 300 may be as simple as a hose 310 with a tap spout 320 at the end. In other embodiments, tap system 300 may be a ball lock system, a Sankey system, an American tap system, or any other commercial tap system. In a preferred embodiment, tap 280 can be coupled with any existing tap system the user may own.

Figure 2:
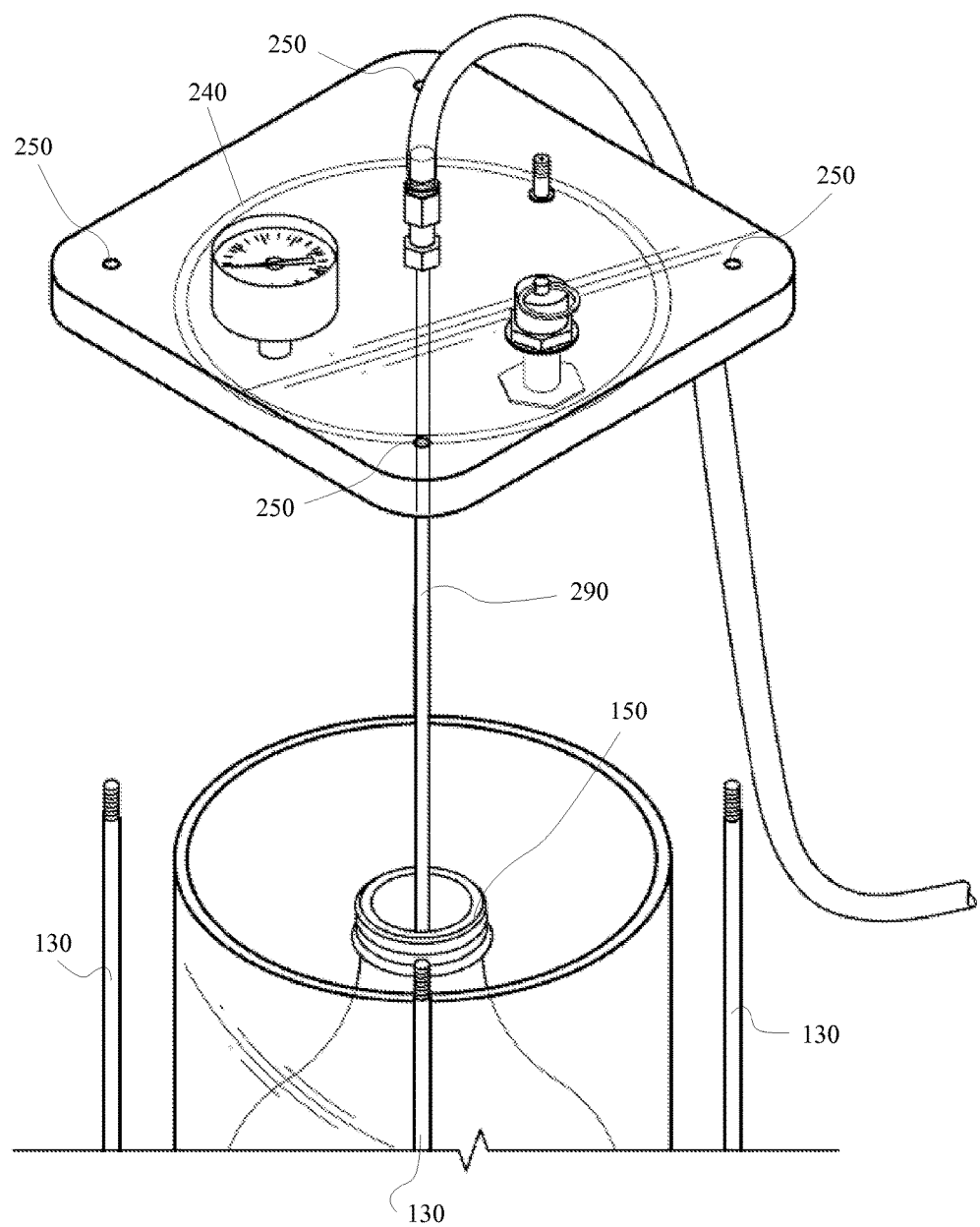
FIG. 2 is an isometric view of the receptacle, showing the lid removed from the top of the vessel.

FIG. 2 depicts how the lid and vessel of FIG. 1 when fasteners 130 are bolts. Fasteners 130 are disposed through holes 250, which aids the proper alignment between the perimeter of chamber 110 and gasket 240. Tap stem 290 descends into beverage package 150, allowing a user to dispense the beverage even when lid 200 is properly sealed onto vessel 100, isolating a beverage package inside the receptacle.

The method of use of the embodiment in FIGS. 1 and 2 may be comprised of removing lid 200 from vessel 100, then placing beverage package 150, in this example a beer growler, into chamber 110. Once beverage package 150 is in place, lid 200 is placed onto vessel 100, with the gasket disposed within a channel on the bottom surface of lid 200, the channel matching the perimeter formed by the rim of chamber 110. Fasteners 130 are disposed through holes 250 (shown in FIG. 2), and washers 260 are placed onto the fasteners. Bolts 270 are hand-tightened on fasteners 130 to form an airtight seal aided by compression of the gasket which is pressed into the channel on the bottom surface of the lid by the rim of the chamber during tightening of the bolts and fasteners. A gas tank of, for example, carbon dioxide is coupled with gas valve 210 and gas is pumped into chamber 110. The user may choose to open pressure relief valve 220 a few times to release any remaining oxygen from chamber 110. The user may choose to watch pressure gauge 231, which is coupled with lid 200 through port 230. When the gas has created the appropriate pressure for the particular beverage, the user will stop the flow of gas into chamber 110. When the user dispenses the beverage through tap system 300, the pressure gauge will fall, alerting the user that more gas should be pumped into the chamber. Alternatively, use of the receptacle with a CO2 tank and regulator will ensure that gas enters the chamber to supplement pressure lost by dispensing the beverage. When the user wishes to remove the growler from the chamber, the user simply interrupts the supply of gas and releases some of the pressure through pressure relief valve 220, then unscrews nuts 270, removes washers 260, and pulls the growler from the chamber.

Figure 3:
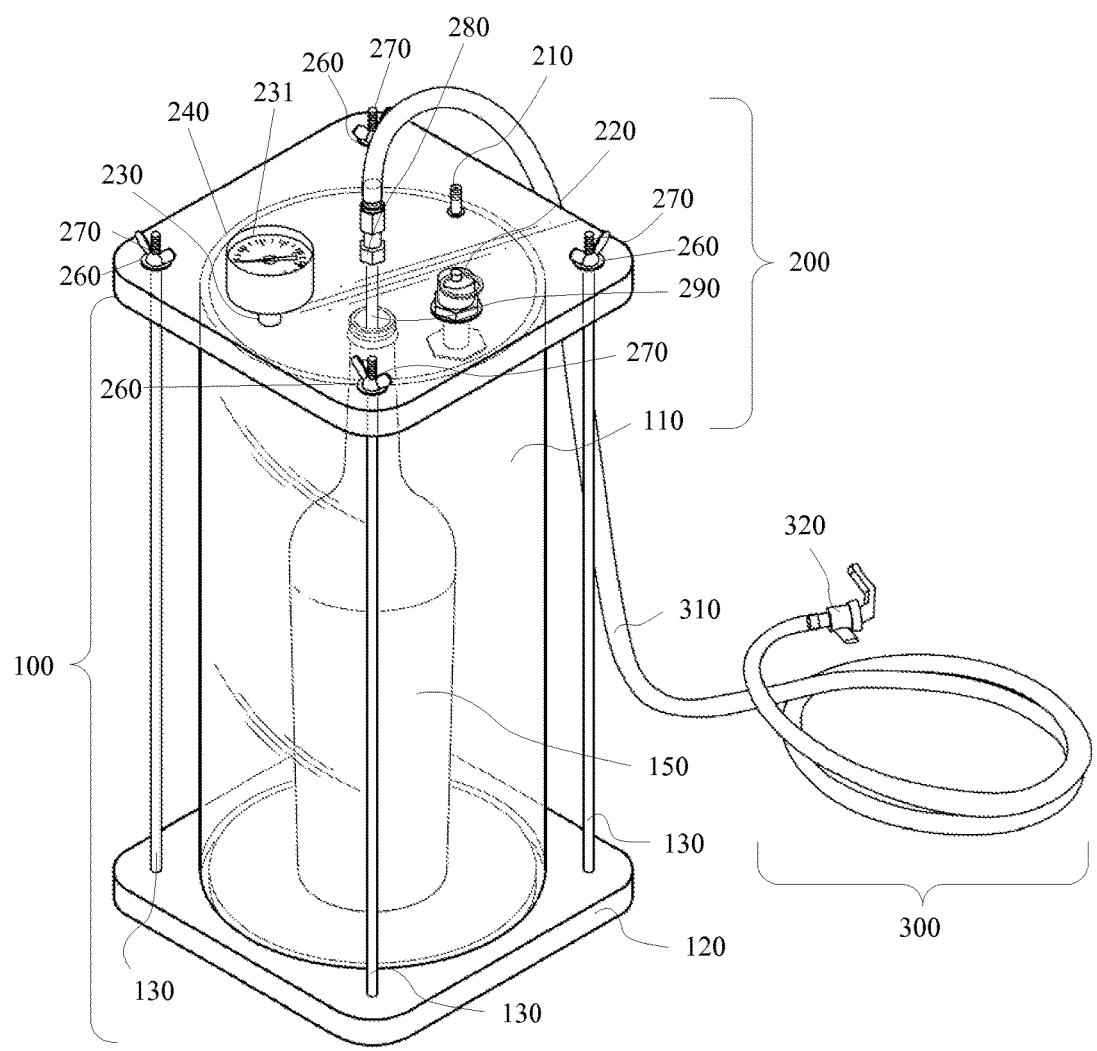
FIG. 3 is an isometric view showing an alternative implementation of the receptacle.

The present invention allows a user to make custom gas and pressure settings. This is critical because different packaged beverages require different gas environments and pressures to maintain freshness, effervescence, and/or entrained gas content. FIG. 3 depicts the invention as it might be used with a wine bottle as beverage package 150.

Wine requires different gas and pressure settings than beer. For instance, a user may choose not to fill chamber 110 with gas, and may simply choose to substantially remove the ambient air from the chamber, creating a vacuum or near vacuum. In another example, a user may choose to replace the ambient air with nitrogen, which prevents the oxidation of the wine. Tap system 300 can still be used in this configuration, allowing a user to keep the wine free from exposure to oxygen, which substantially improves the life of the bottle.

Figure 4:
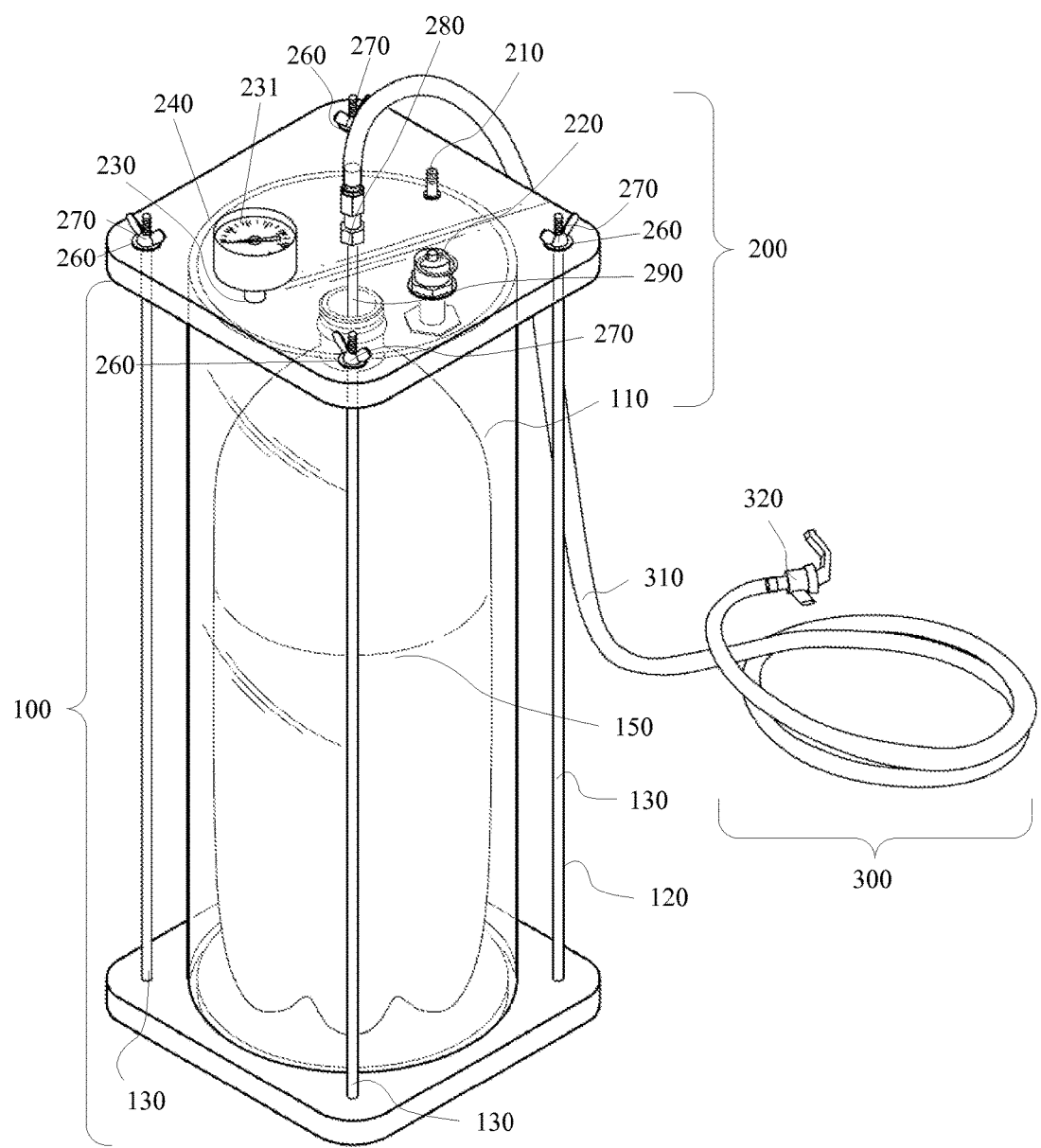
FIG. 4 is an isometric view showing an alternative implementation of the receptacle.

FIG. 4 depicts the invention as used with a two-liter bottled beverage as the beverage package 150. The present invention is versatile enough that nearly any prepackaged beverage could be stored in it for preservation. In the embodiment depicted in FIG. 4, chamber 110 may be slightly longer than it would be for other uses, but, because tap stem 290 descends into the bottle, differing lengths are not necessarily required. FIG. 5b shows tap stem 290 in more detail. In a preferred embodiment, tap stem 290 is comprised of three parts: first segment 291 is rigid, second segment 292 is flexible, and third segment 293 is rigid. In this embodiment, stem 290 can reach the sides and corners of beverage packages, and can be used with packages of different sizes and heights, such as a growler or a two-liter bottle of soda.

FIG. 5a shows an exemplary embodiment of tap system 300, wherein the system is comprised of a nut 330, which couples with tap port 280, a hose 310, and a spout 320. This is merely one example of tap system 300, and, as discussed earlier herein, any number of tap systems can be coupled with lid 200.

Figure 6A:
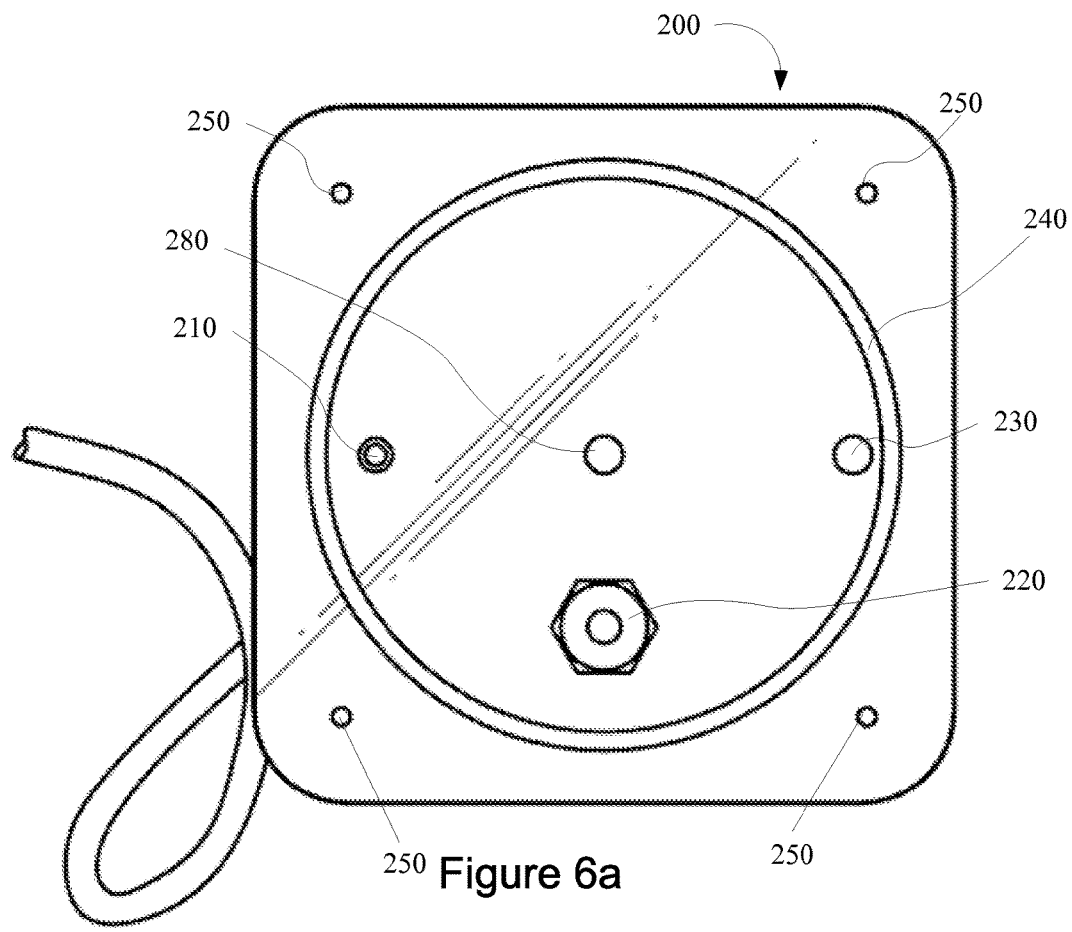
FIG. 6a is a bottom view of the lid of the receptacle.

FIG. 6a is a bottom view of lid 200. In this exemplary embodiment, lid 200 is of a larger area than the perimeter formed by the rim of chamber 110. Gasket 240 is disposed within a channel on the bottom surface of lid 200. The channel may be a square-cut channel for receiving the top rim of the chamber. The dimension of the channel and gasket are of substantially the same thickness as chamber 110, allowing the proper seal to form.

Figure 6B:
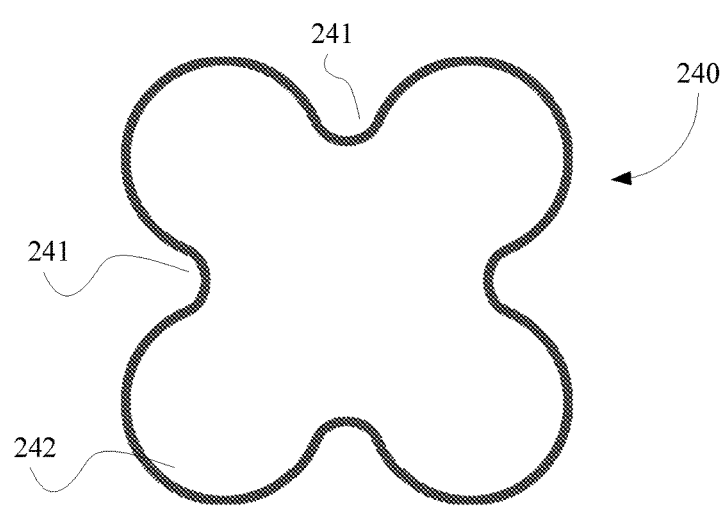
FIGS. 6b and 6c are a cross section view of a gasket for use in the lid of the receptacle and an isometric view of a gasket for use in the lid of the receptacle.
Figure 6C:
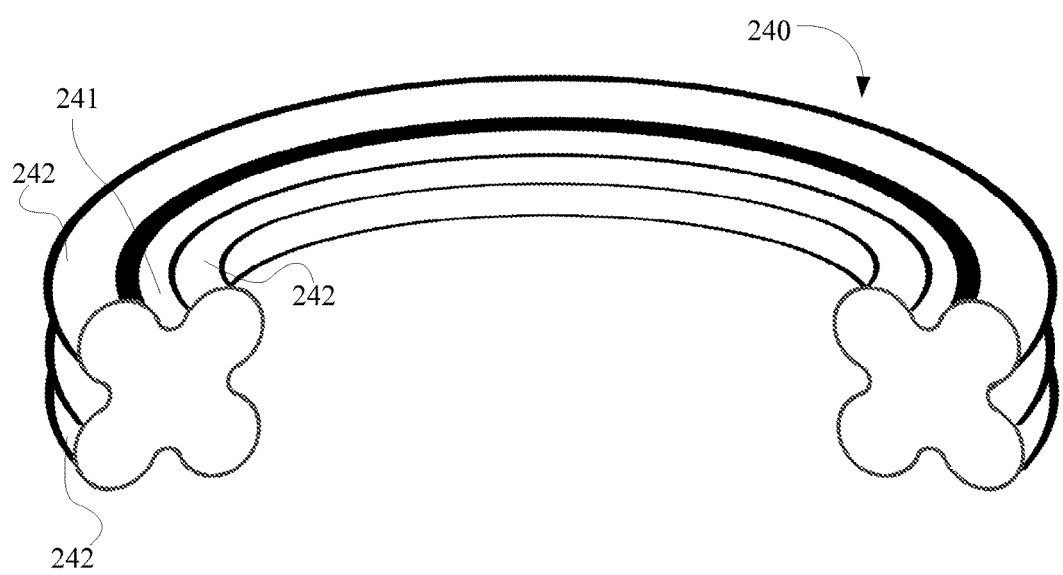

FIGS. 6b and 6c are a cross section view of a gasket for use in the lid of the receptacle and an isometric view of a gasket for use in the lid of the receptacle. In some embodiments, the gasket may be an X-Ring or a Quad-Ring. The gasket may have four lobes 242, each lobe having a rounded exterior profile. The four lobes 242 are separated by four concave sides 241. When the gasket is inserted into the square-cut channel on the bottom surface of the lid and compressed by the top rim of the chamber during tightening of the fasteners, the lobes separated by the concave sides allow the gasket to press into the corners of the channel, increasing the impermeability of the seal. It should be understood, though, that any number of gasket cross sections may provide a sufficient seal to prevent oxidation of the packaged beverage, and the disclosure of the X-Ring or Quad-Ring gasket shape should not be construed as limiting. (The proportion of the gasket in FIGS. 6b and 6c is not to scale, but the lobes have been enlarged relative to the diameter of the gasket to better depict the lobes and concave sides.)

Figure 7A:
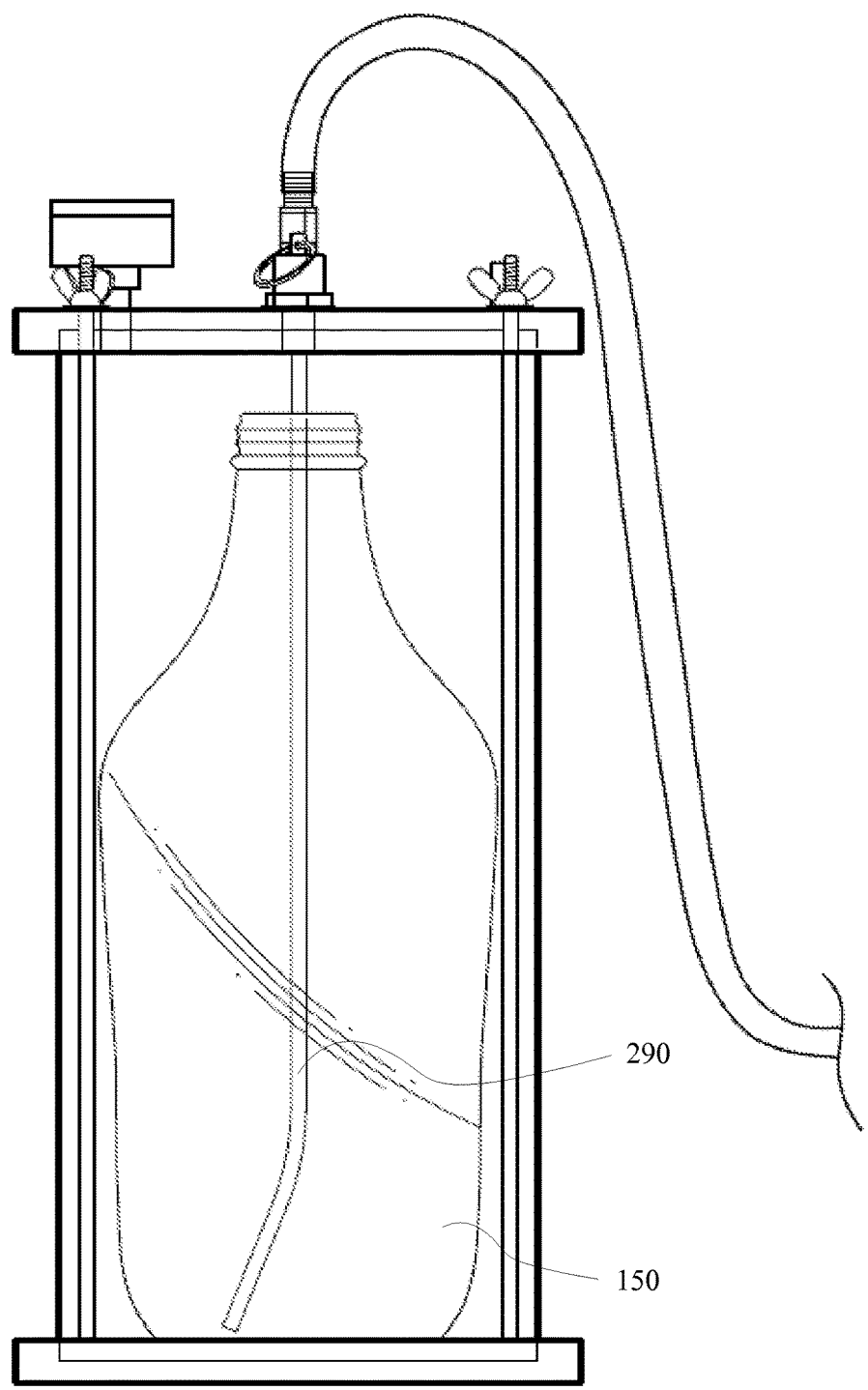
FIG. 7a is a side view of the receptacle.

FIG. 7a is a side view of one embodiment of the present invention, as it might be used with a beer growler. This figure shows how tap stem 290 can be placed in beverage package 150, allowing the stem to reach the sides of the beverage package and pulling more of the beverage than most pump systems allow.

Figure 7B:
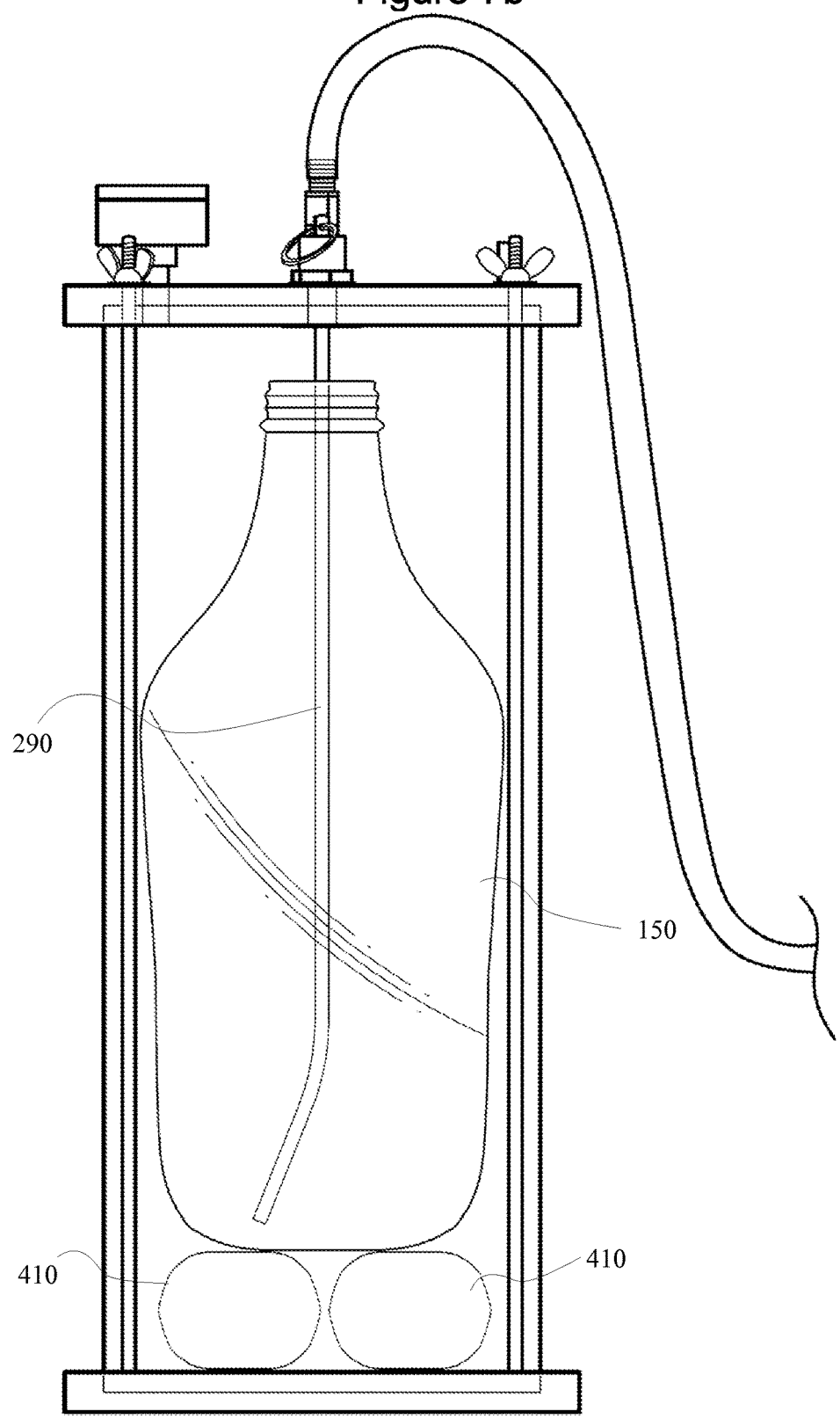
FIG. 7b is a side of an alternative embodiment of the receptacle.

FIG. 7b is a side of an alternative embodiment of the receptacle. In embodiments where the chamber is long or tall enough to accommodate a two-liter bottle of soda as the beverage package 150. When a beverage package shorter than a two-liter bottle of soda (such as a growler, as depicted here) is used with such an embodiment, one or more spacers 410 may be used and/or included with the receptacle to ensure the tap stem 290 is long enough to reach into the bottom corner of the beverage package. In different embodiments, the one or more spacers may be height-adjustable via stacking multiple spacers, inflation of the one or more spacers, or other adjustment means.

Figure 8:
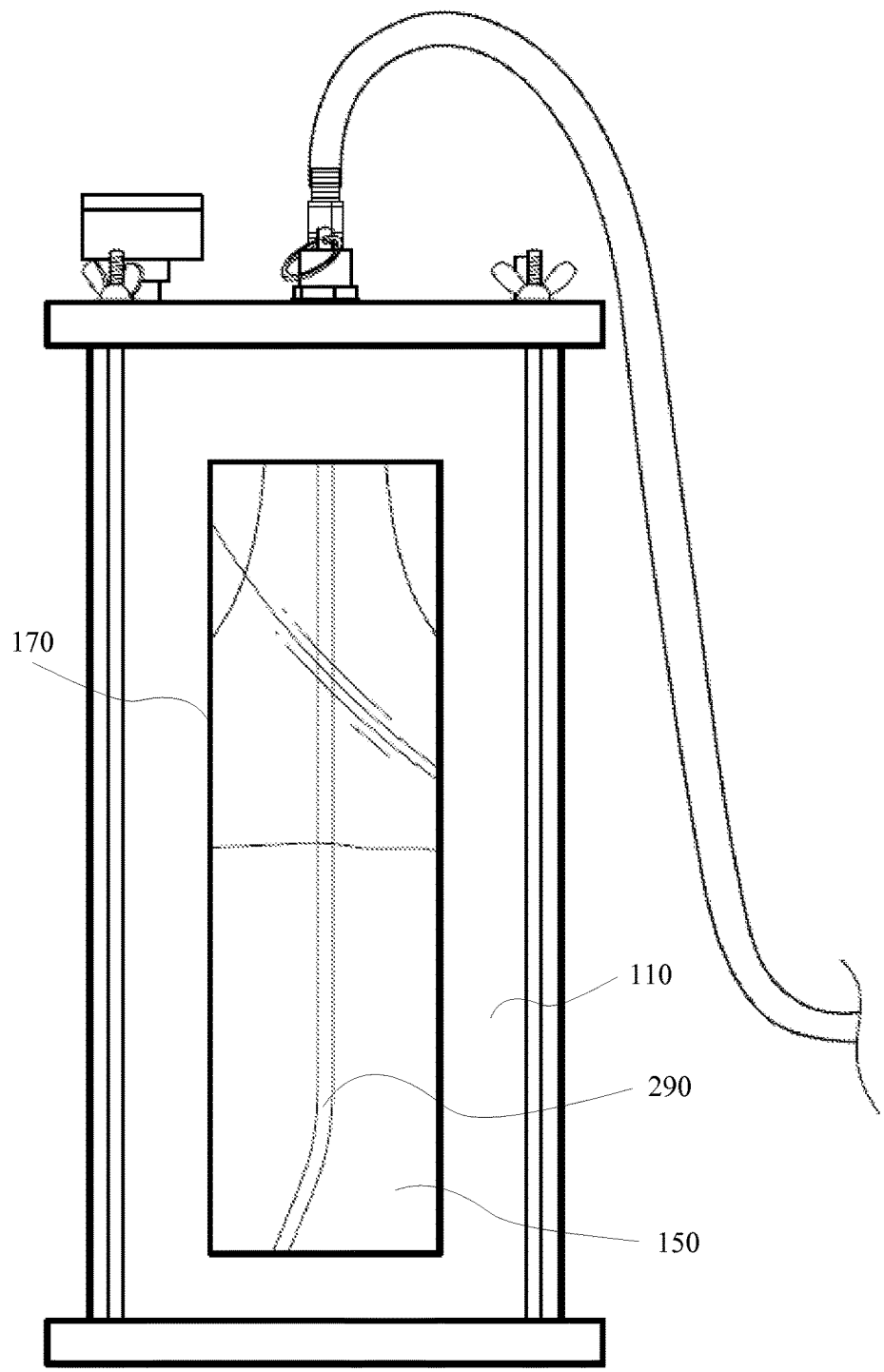
FIG. 8 is a side view of an alternative embodiment of the receptacle.

FIG. 8 is a side view of another embodiment of the present invention. In this embodiment, chamber 110 may be comprised of an opaque material, and window 170 may be present to allow a user to see the beverage, and, more specifically, the level or amount of beverage that remains in the package. Window 170 may also allow the user to see which beverage is stored in the receptacle. When chamber 110 is opaque or translucent, rather than transparent, it may allow for decorative elements to be included, such as lights or speakers.

Figure 10A:
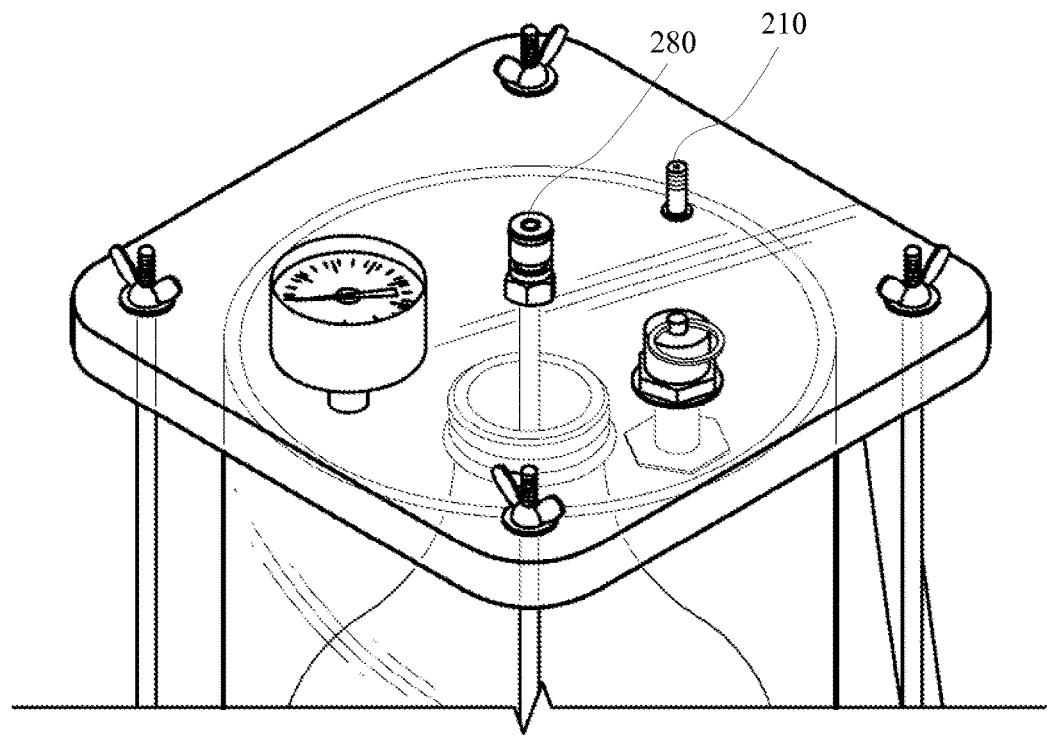
FIG. 10a is an isometric view of an alternative embodiment of the lid of the receptacle.
Figure 10B:
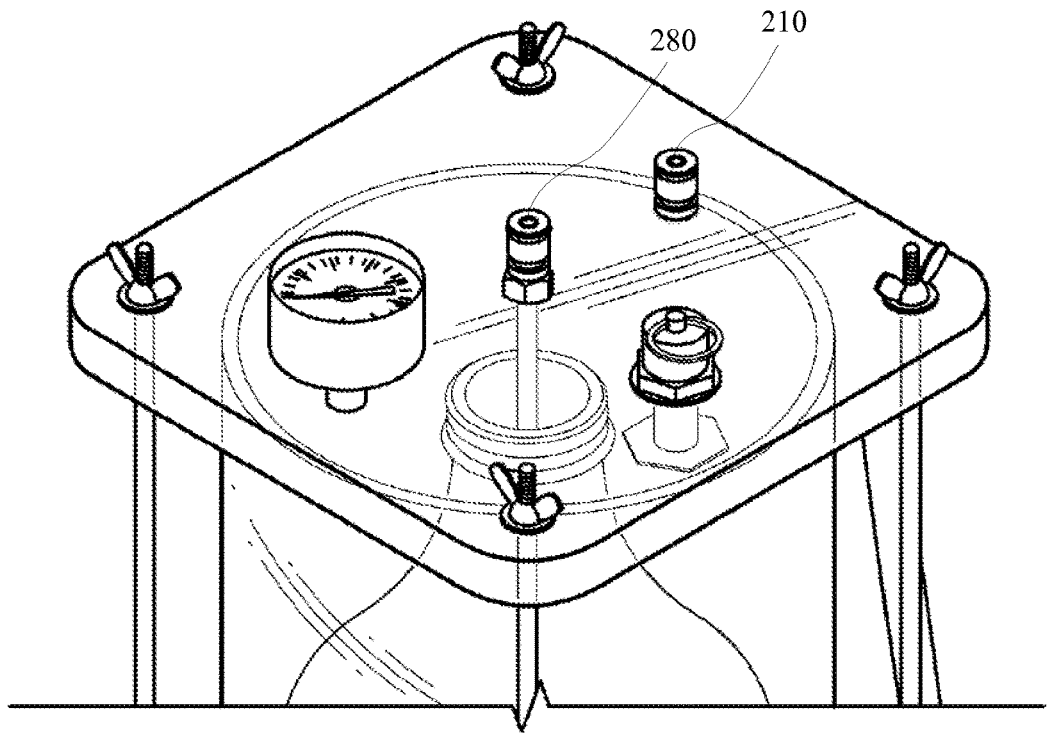
FIG. 10b is an isometric view of another alternative embodiment of the lid of the receptacle.

FIG. 9 is a side view of one embodiment of the present invention, wherein tap port 280 is coupled with a standard tap 360. In this depiction, the standard tap is a pump tap, but any number of standard tap systems may be coupled with tap port 280 without altering the function of the present invention. FIG. 10a shows lid 200 with tap port 280 as a ball lock coupler, allowing a user who already has the commonly used ball lock tap system to couple the system with lid 200. FIG. 10b shows lid 200 with ball lock couplers on both tap port 280 and gas valve 210, further lending utility to the use of standard ball lock tap systems.

Figure 11:
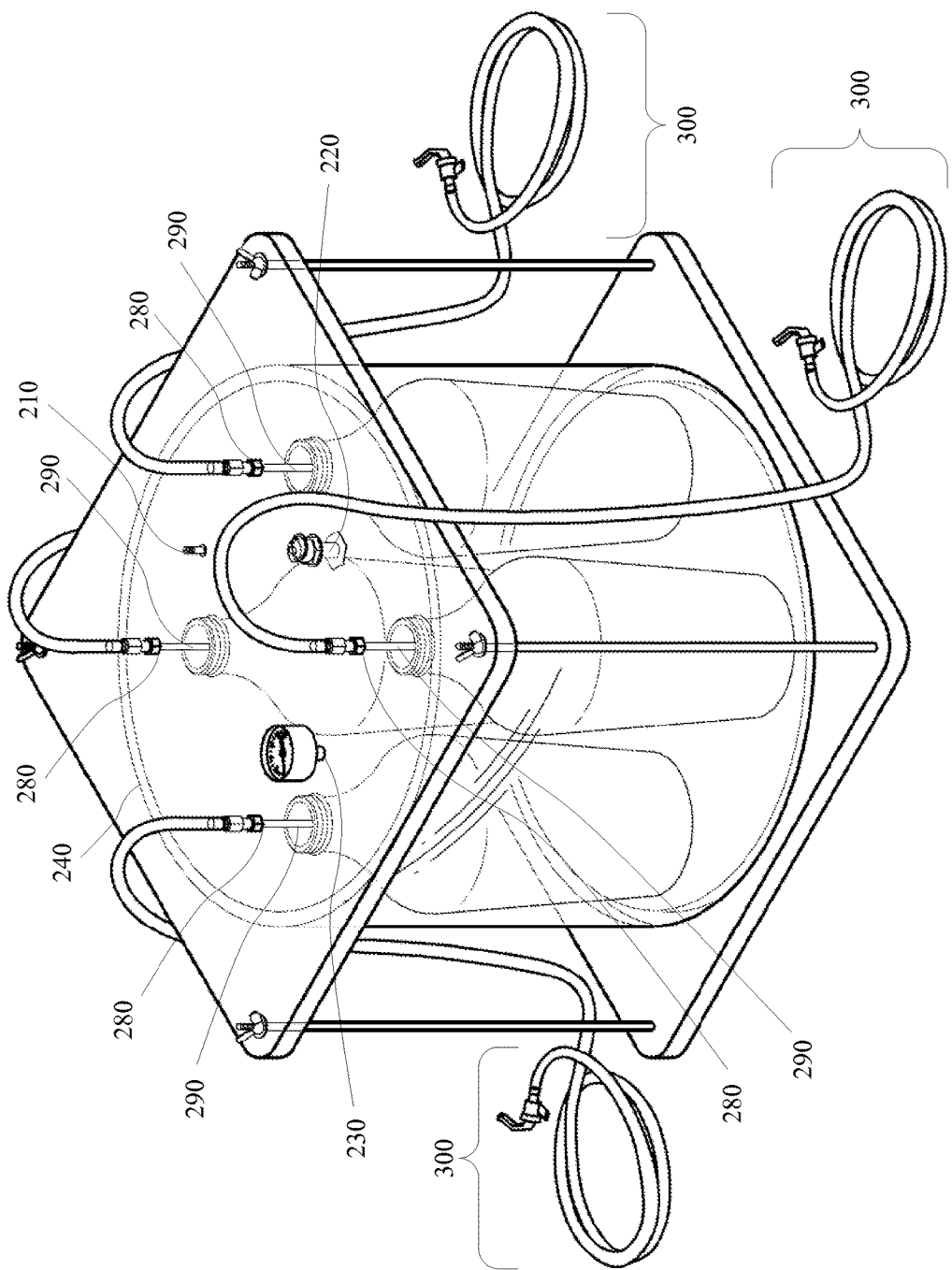
FIG. 11 is an isometric view showing an alternative embodiment of the receptacle, wherein the receptacle can be used to store multiple packaged beverages.

FIG. 11 shows an alternative embodiment of the present invention, wherein multiple packaged beverages are disposed inside chamber 110. In this embodiment, lid 200 still has one gas valve 210, one pressure relief valve 220, one pressure gauge port 230, and one gasket 240. In a non-limiting example, four bottles 150 are disposed inside chamber 110, and each bottle has its own tap port 280 and tap stem 290. Each tap port 280 can be coupled with tap system 300. This is an exemplary embodiment, and it should not be construed as limiting the number of taps to four. The system may be used with one, two, three, five, or any other number. In some applications, three may be an optimum safe number of packages when factoring pressure loading over a large area. However, a multiple bottle embodiment may contain any number of tap ports and packaged beverages without altering the function of the multiple bottle embodiment.

Figure 12:
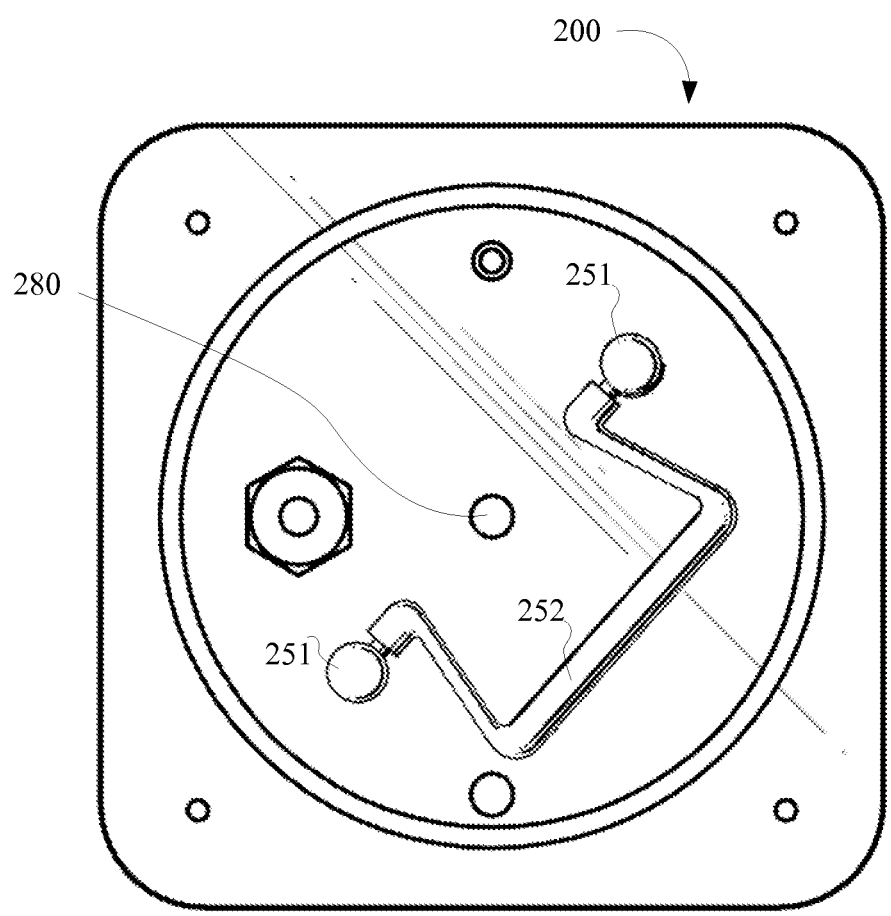
FIG. 12 is a top view of another alternative embodiment of the receptacle.

FIG. 12 is a top view of another alternative embodiment of the receptacle. In some embodiments, the receptacle is provisioned with a carrying handle 252. The carrying handle may be disposed between mounting studs 251, which are disposed to either side of tap port 280. In different embodiments, the receptacle may have more than one carrying handle, may include a different type of carrying handle than the swivelable handle, and/or may have one or more handles mounted on a different surface of the receptacle.

Figure 13A:
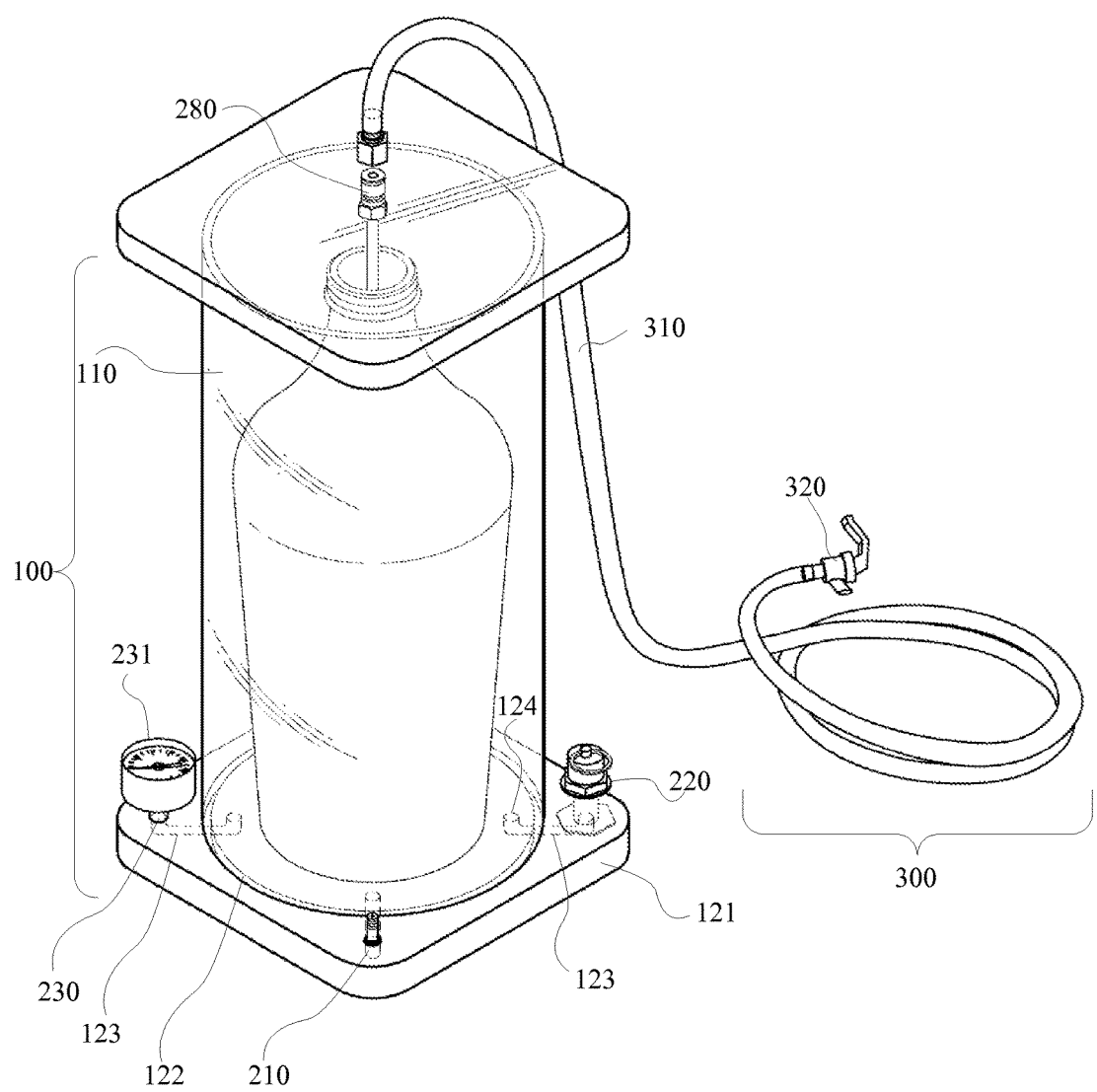
FIG. 13a is an isometric view of an embodiment of the receptacle for storing and preserving packaged beverages.
Figure 13B:
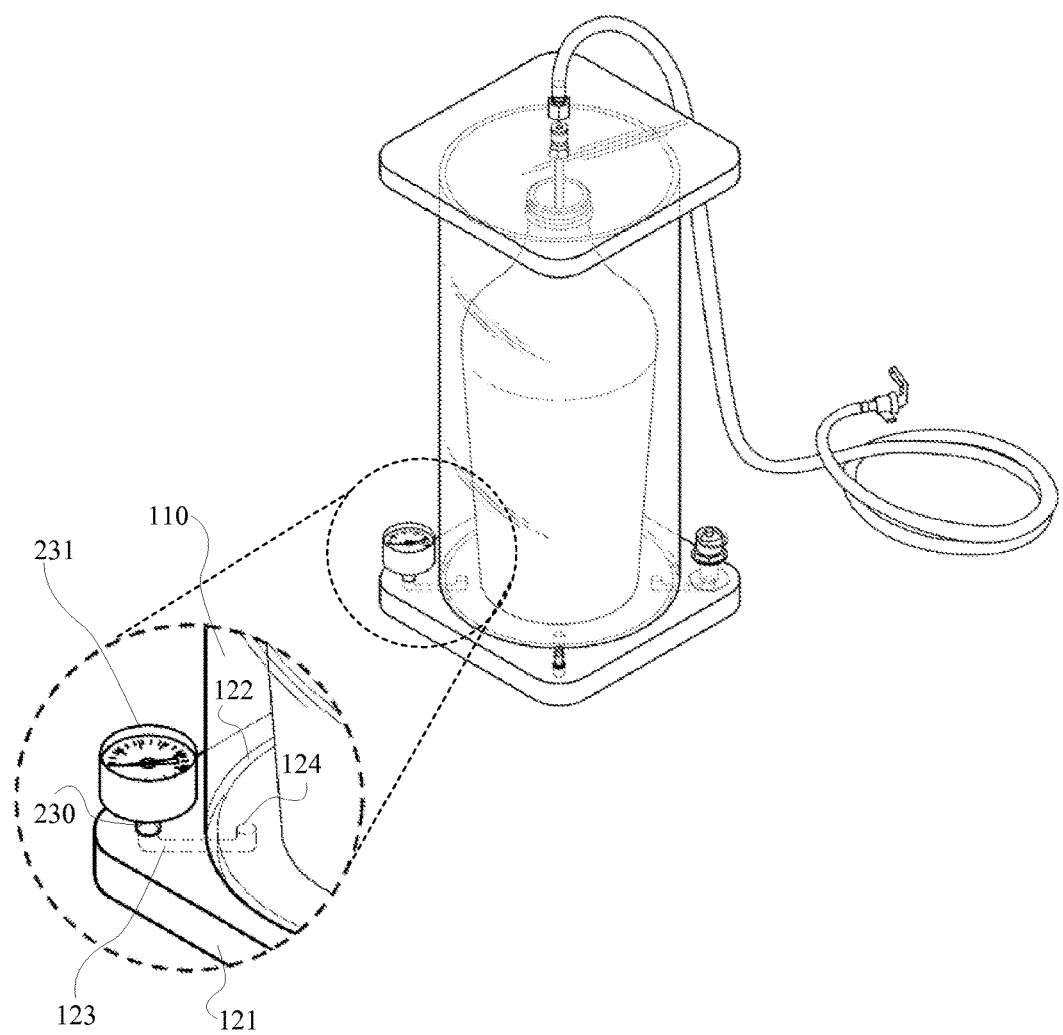
Figure 13C:
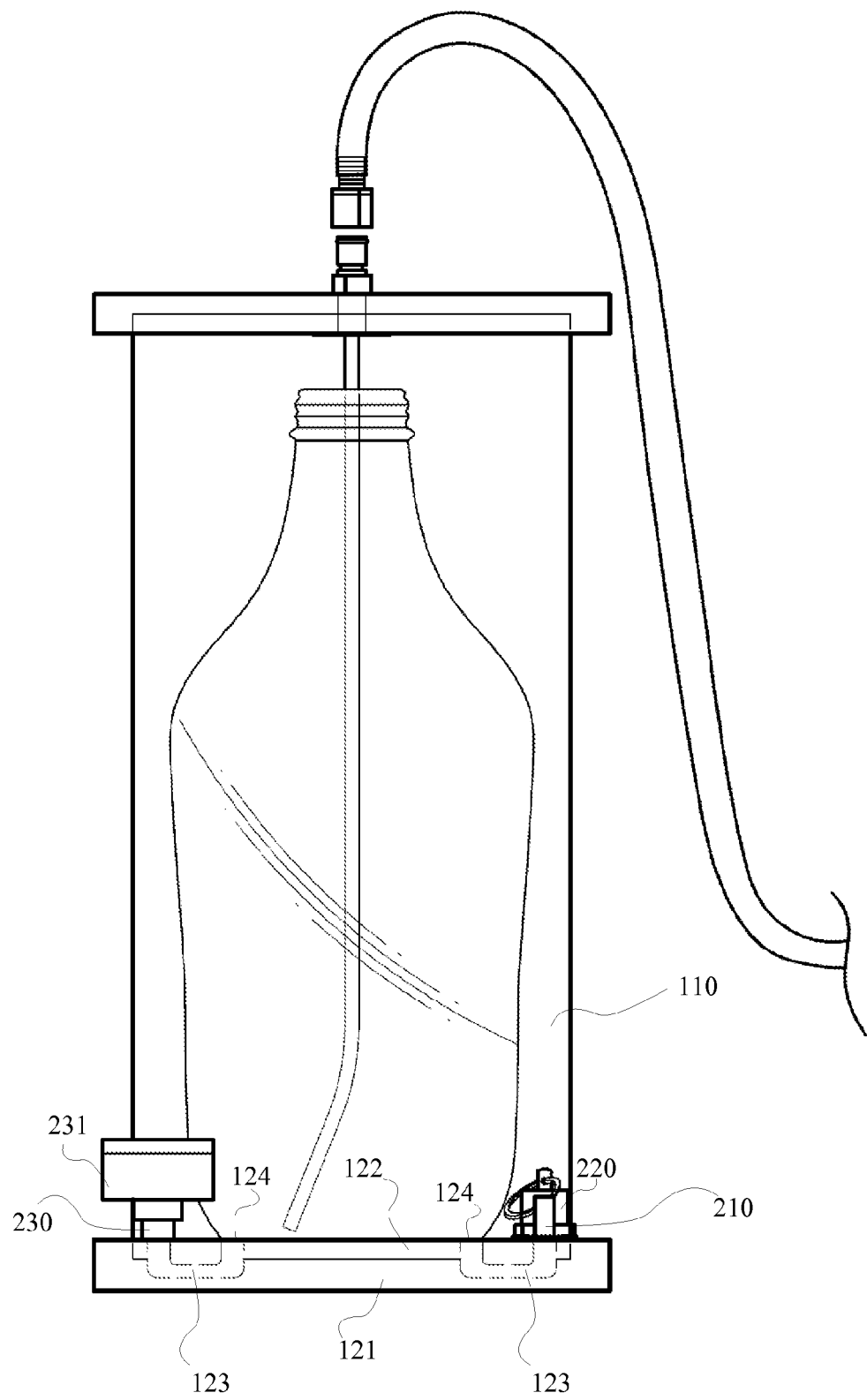
Figure 13D:
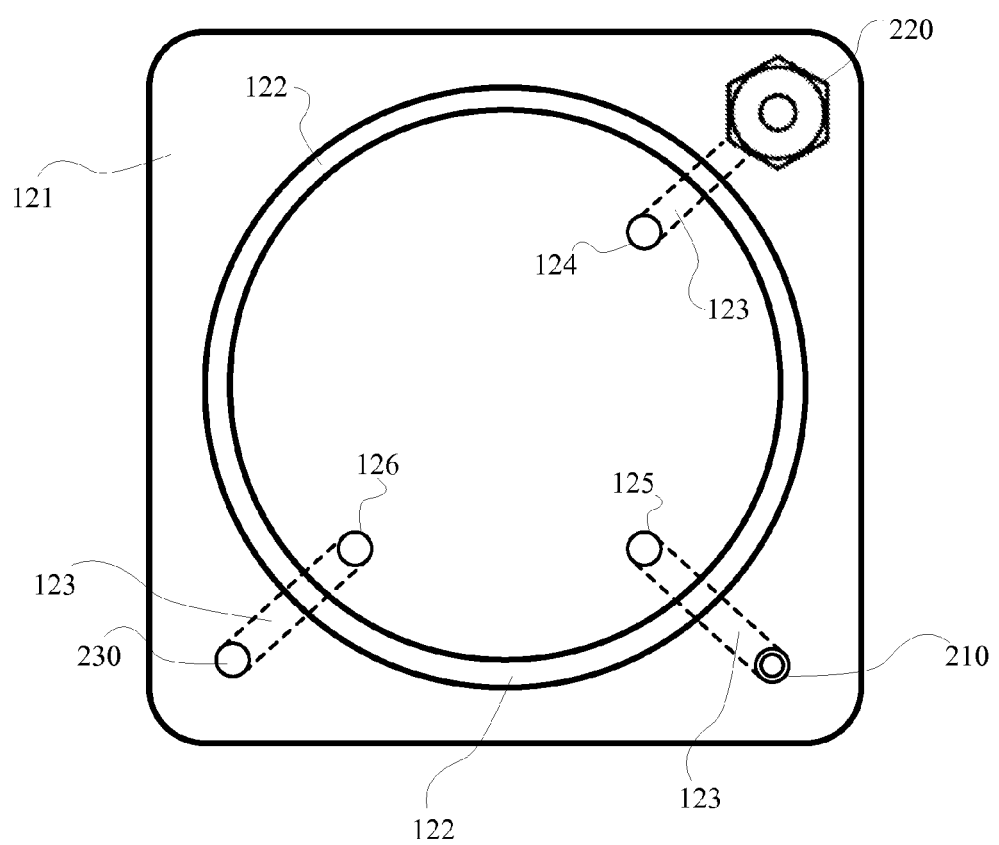

FIG. 13a is an isometric view of an embodiment of the receptacle for storing and preserving packaged beverages. FIG. 13b is a close-up view of a portion of the embodiment depicted in FIG. 13a. FIG. 13c is a side view of a portion of the embodiment depicted in FIG. 13a. FIG. 13d is a top view of an alternate embodiment of a base depicted in FIG. 13a. In some embodiments, the receptacle for storing and preserving packaged beverages may feature one or more elements being located on an alternate base 121 rather than on the lid. For example, one or more of the gas valve 210, pressure gauge 231 (and its port 230), or pressure relief valve 220 may be located on the alternate base 121.

Fasteners 130 (not shown in FIGS. 13a-13d but depicted in at least FIG. 1) may be removed to make room for the elements relocated to the alternate base. An alternate closure mechanism for the receptacle may be provided (such as the yoke discussed with respect to FIG. 14, or another clamping device). In different embodiments, the fasteners may remain and the gas valve, pressure gauge port, and/or pressure relief valve relocated to the base may be offset from the location of the fasteners (i.e. to the side of the fasteners). Moving one or more of the gas valve, pressure gauge (and its port 230), or pressure relief valve to the base, leaving only the tap port 280 through the lid, may provide a cleaner appearance for the lid of the receptacle and/or move sensitive instruments such as the pressure gauge to a more protected position between the lid and base.

Particularly, alternate base 121 includes passages 123 (depicted in dashed lines in FIGS. 13a-13d) through which gas passes from the exterior of the receptacle to its interior. Passages 123 are disposed through the interior of the alternate base 121, including a portion of each passage which passes underneath channel 122. At one end, the passages terminate in ports which are disposed on an interior section of the alternate base, such that gas passing through the passages vents into the tube 110 of the receptacle. At opposite ends of the passages are the gas valve, pressure gauge, and pressure relief valve.

As may be seen in FIGS. 13a-13d, the passages 123 permit gas to travel from, for example, the gas valve 210 through the inside of the alternate base 121 along passage 123, and to vent into the receptacle through gas port 125. Likewise, upon gas entering the receptacle through the gas port, the pressurization forces gas through port 124 for the pressure relief, then into another passage 123 and to the pressure relief valve 220 where the gas may be vented from the receptacle upon operation of the pressure relief valve. The pressurization also forces gas through port 126 for the pressure gauge, then into another passage 123 and to the pressure gauge port 230. If a pressure gauge 231 is connected to the pressure gauge port, the pressure inside the receptacle may be read.

Figure 14:
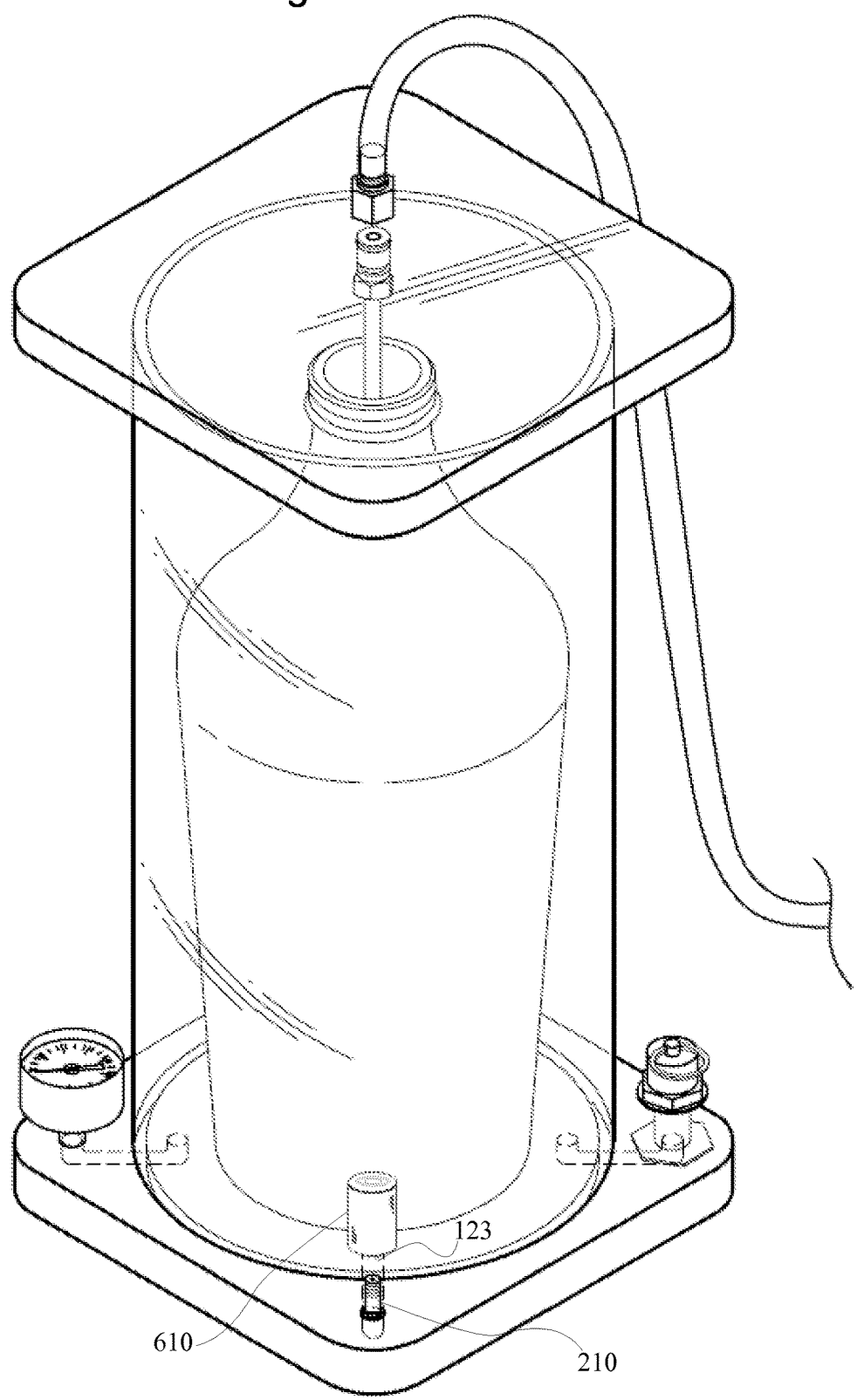
FIG. 14 is an isometric view of an alternate embodiment of the receptacle for storing and preserving packaged beverages.

FIG. 14 is an isometric view of an alternate embodiment of the receptacle for storing and preserving packaged beverages. In some embodiments, a diffuser 610 may be disposed at the end of passage 123. In such embodiments, gas would come in through the gas valve 210, flow through passage 123, and be vented into the receptacle through the diffuser which is inserted into the gas port 125 (not shown in FIG. 14 but visible at least in FIG. 13d). A diffuser emits gas through a plurality of openings or through permeable portions of the diffuser. The surface area through which gas passes to enter the receptacle is increased through use of a diffuser. Via the diffuser, the receptacle would receive a slow and gentle inlet of gas, such as CO2. The resulting reduced mixing of air would allow a better purge of oxygen within the receptacle.

Figure 15A:
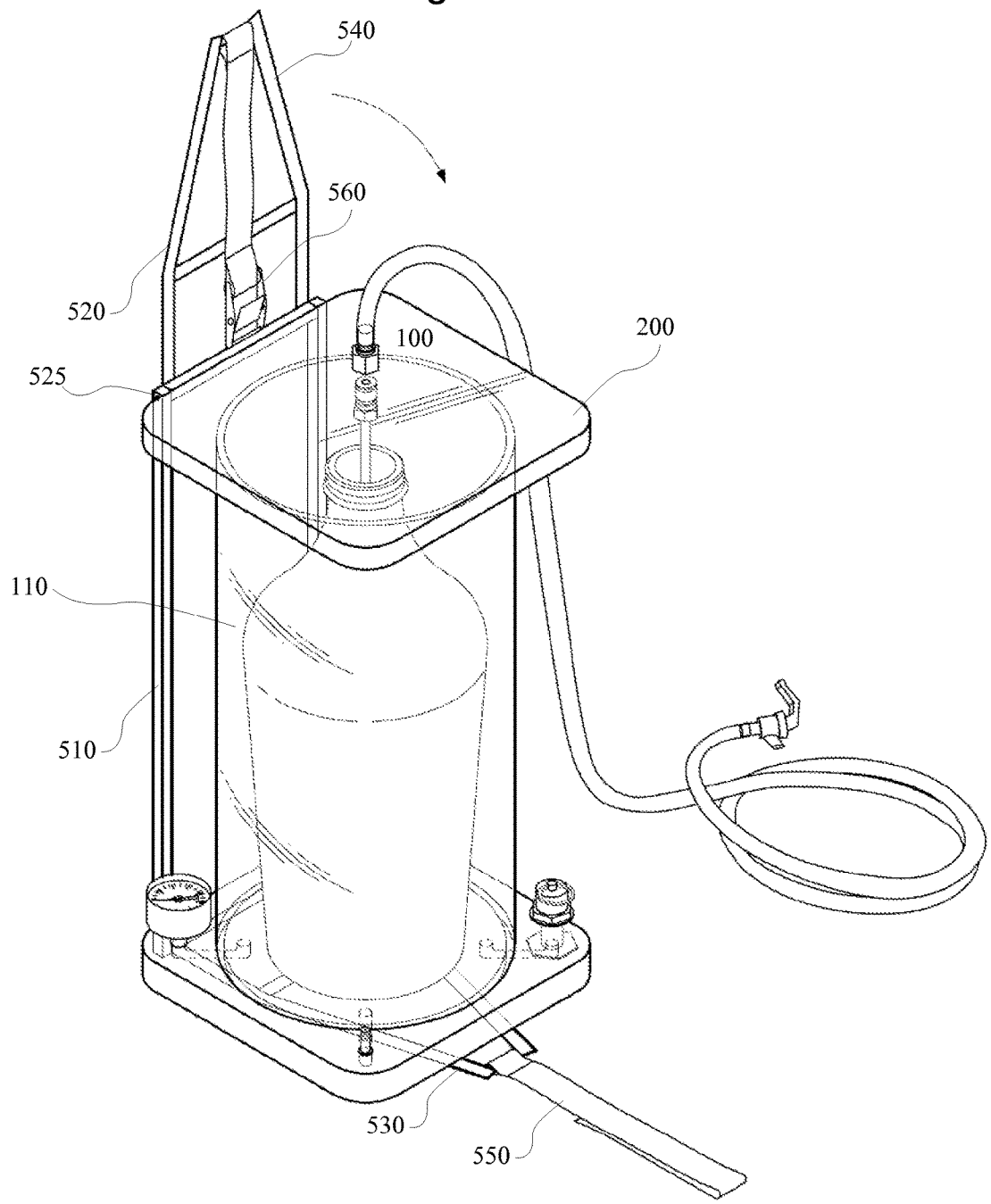
FIG. 15a is an isometric view of an alternate embodiment of the receptacle for storing and preserving packaged beverages.
Figure 15B:
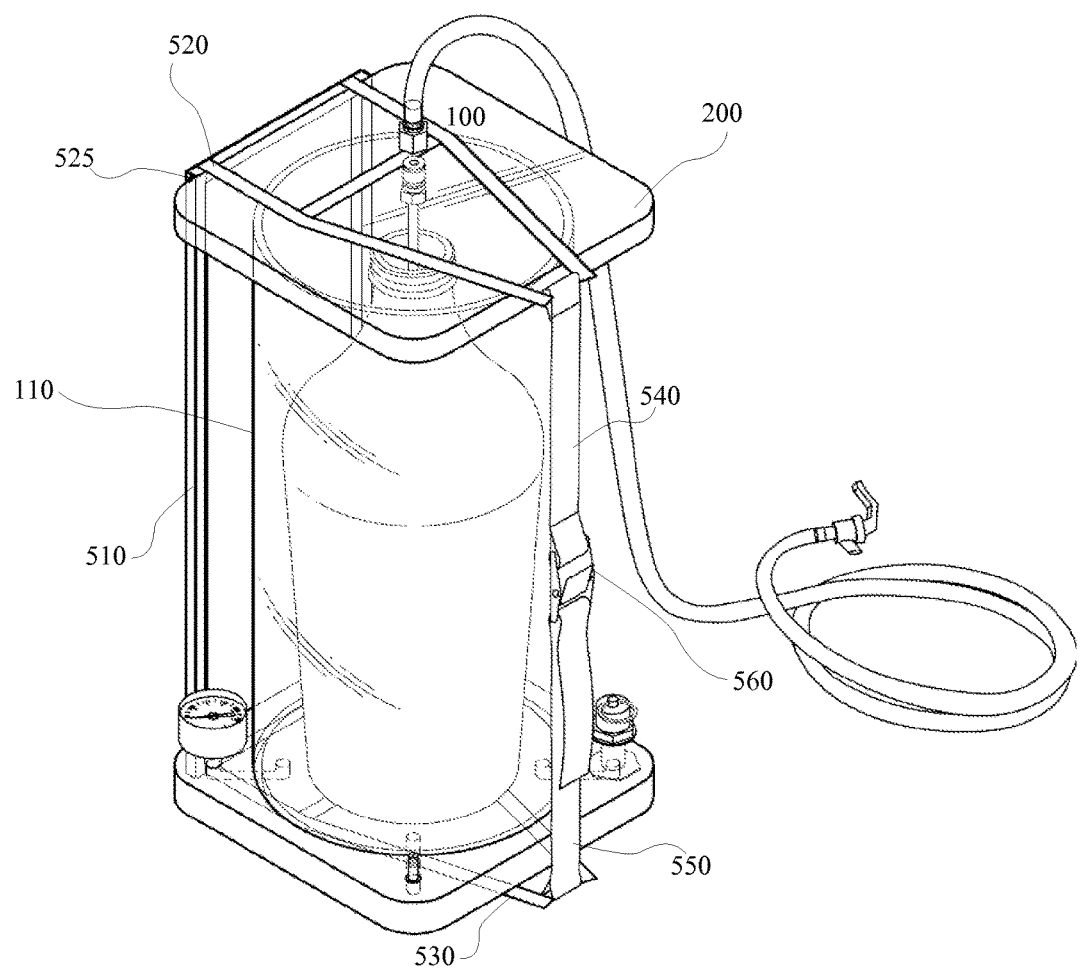

FIG. 15a is an isometric view of an alternate embodiment of the receptacle for storing and preserving packaged beverages. FIG. 15b is another isometric view of the alternate embodiment depicted in FIG. 15a. It may be desirable to provide an alternate means of closure of the system. For example, rather than the fastener and nut system depicted and described with respect to FIG. 1, a yoke or other means of clamping the major elements of the receptacle together may be employed. Receptacle 100 may be placed within a yoke, the yoke including a vertical yoke side 510 which is substantially a similar height to that of tube 110. In some embodiments, the vertical yoke side 510 has a fixed height. In different embodiments, the vertical yoke side has an adjustable height to accommodate different height tubes and/or growlers. The yoke may include a yoke top 520 which is hingedly coupled with the vertical yoke side via hinge 525. The yoke may further include yoke bottom 530, which may be fixedly coupled with the vertical yoke side, or may be hingedly coupled with the vertical yoke side.

The yoke top 520 may have a yoke top strap 540 connected at an end of the yoke top opposite the hinge. The yoke bottom 530 may have a yoke bottom strap 550 connected at a corresponding end of the yoke bottom. The yoke top strap and/or the yoke bottom strap may have a closure for securably coupling the top and bottom straps. In some embodiments, the closure may be a ratchet 560. In other embodiments, the closure may include a turnbuckle, a latch, a fastex buckle, or other mechanism for securably coupling and tightening the top and bottom straps.

When inserting a growler or other beverage package into the receptacle, the lid is removed to permit the beverage package to be placed in the tube as described elsewhere herein. Also as described elsewhere herein, lid 200 is placed atop tube 110. With the instant alternate embodiment, the operation of completing the airtight seal of the enclosure and clamping the lid down over the tube does not utilize the fasteners and nuts described in FIG. 1 but instead employs the yoke for compressing the lid and tube. As may be seen in FIG. 15a, the receptacle 100 is seated atop the yoke bottom 530 and adjacent to the yoke vertical side 510. Yoke top 540 is flipped downward in the direction of the arrow and comes to rest atop lid 200. As may be seen in FIG. 15b, to complete the operation, the yoke top strap and yoke bottom strap are coupled using ratchet 560 (or other closure as appropriate). The strap may be pulled to tighten the lid, compressing the gasket between the lid and tube. To remove a growler or other beverage package, the foregoing steps are completed in reverse.

Importantly, while FIGS. 15a and 15b depict the yoke in use with an embodiment of the receptacle having the gas valve, pressure relief, and pressure gauge disposed on top of the base, it is intended that the yoke could also be used with embodiments having the three aforementioned elements disposed on the lid (e.g. the embodiment shown in FIG. 1). The construction of the yoke top and lid would be such that the yoke top could be flipped down over the lid without contacting the gas valve, pressure relief, or pressure gauge.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A beverage preservation device comprising:
   a vessel including at least a base and a tube;
   a lid, the lid removably coupled with the vessel;
   a gas valve, the gas valve disposed through a top surface of the base;
   a passage disposed through an interior portion of the base, the passage including at least:
      an end of the passage coupled with the gas valve; and
      a vent into the vessel disposed at an opposing end of the passage; and
   a tap port, the tap port disposed through the lid.

2. The beverage preservation device of claim 1, wherein the passage disposed through an interior portion of the base comprises:
   a passage disposed between the top surface of the base and the bottom surface of the base, the passage including at least a portion extending laterally through the base.

3. The beverage preservation device of claim 2, further comprising:
   the passage including at least one substantially vertical portion at an interior end of the portion extending laterally through the base, the first substantially vertical portion extending to an aperture in the top surface of the base to form the vent into the vessel.

4. The beverage preservation device of claim 1, wherein the vessel including at least a base and tube comprises:
   a vessel including at least the base having a circular square-cut channel on the top surface of the base configured for receiving the tube.

5. The beverage preservation device of claim 1, wherein the passage disposed through an interior portion of the base comprises:
   a passage disposed through an interior portion of the base, the passage passing underneath a channel in the base for receiving the tube.

6. The beverage preservation device of claim 1, wherein the vessel including at least a base and tube comprises:
   a vessel, the vessel including at least a one-piece vessel including at least a base section and a tube section of the one-piece vessel.

7. The beverage preservation device of claim 1, further comprising:
   a pressure gauge port.

8. The beverage preservation device of claim 1, further comprising at least one of:
   another passage disposed through another interior portion of the base, the another passage including at least an end coupled with a pressure relief and a vent into the vessel disposed at an opposing end; and
   another passage disposed through another interior portion of the base, the another passage including at least an end coupled with a pressure gauge port and a vent into the vessel disposed at an opposing end.

9. The beverage preservation device of claim 1, further comprising:
   a pressure relief.

10. The beverage preservation device of claim 1, wherein the lid further comprises:
    a gasket disposed on the bottom surface of the lid.

11. The beverage preservation device of claim 1, further comprising:
    at least one of a fastener arrangement or closure arrangement configured for compressing together the lid, gasket, and tube to form an airtight seal of the receptacle.

12. The beverage preservation device of claim 1, further comprising:
    a yoke configured for compressibly closing the lid over the tube.

13. The beverage preservation device of claim 1, wherein the vent into the vessel disposed at an opposing end of the passage comprises:
    a gas diffuser.

14. The beverage preservation device of claim 1, wherein the lid comprises:
    a tap stem coupled with the tap port.

15. The beverage preservation device of claim 14, wherein the tap stem comprises:
    a rigid first portion coupled with the tap port;
    a flexible second portion coupled with the rigid first portion; and
    a rigid third portion coupled with the flexible second portion.

16. The beverage preservation device of claim 15, wherein the flexible second portion of the tap stem is slightly curved.

17. The beverage preservation device of claim 1, wherein the lid and the vessel are removably couplable.

18. The beverage preservation device of claim 17, wherein the lid coupled with the vessel forms an airtight seal.

19. A beverage preservation system, comprising:
    a receptacle, including at least a base, for removably receiving at least one beverage package;
    means for maintaining an airtight seal of the receptacle;
    means for pressurizing the receptacle, including at least a passage disposed through an interior portion of the base, the passage including at least an end of the passage coupled with a means for accepting a gas source and a vent into the receptacle disposed at an opposing end of the passage; and means for enabling dispensing, upon the receptacle being pressurized, of a content contained by a beverage package received by the receptacle.

20. A beverage preservation device, comprising:

a vessel including at least a base;

a lid, the lid removably coupled with the vessel;

a passage disposed through an interior portion of the base, the passage including at least a vent into the vessel at a first end of the passage and a gas valve disposed at an opposing end of the passage; and a dispensing means.

* * * * *